United States Patent
Nakamura

(10) Patent No.: US 9,880,264 B2
(45) Date of Patent: Jan. 30, 2018

(54) PROJECTION OPTICAL SYSTEM AND OBJECT DETECTION DEVICE

(71) Applicant: Tadashi Nakamura, Tokyo (JP)

(72) Inventor: Tadashi Nakamura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 182 days.

(21) Appl. No.: 14/872,534

(22) Filed: Oct. 1, 2015

(65) Prior Publication Data
US 2016/0097843 A1    Apr. 7, 2016

(30) Foreign Application Priority Data
Oct. 6, 2014   (JP) ................... 2014-205741

(51) Int. Cl.
| | |
|---|---|
| G06M 7/00 | (2006.01) |
| G01S 7/481 | (2006.01) |
| G01S 17/02 | (2006.01) |
| G02B 27/09 | (2006.01) |

(52) U.S. Cl.
CPC .......... *G01S 7/4814* (2013.01); *G01S 17/026* (2013.01); *G02B 27/0927* (2013.01); *G02B 27/0955* (2013.01); *G02B 27/0972* (2013.01)

(58) Field of Classification Search
CPC ... F21V 5/04; F21V 5/00; F21V 5/048; H01L 33/58; G02B 3/08; G02B 19/0052; G02B 27/09; G02B 27/0911; G02B 27/0955; G02B 27/0972
See application file for complete search history.

(56) References Cited

U.S. PATENT DOCUMENTS

| | | | | |
|---|---|---|---|---|
| 5,140,220 A | * | 8/1992 | Hasegawa | ................. F21V 3/00 257/E33.059 |
| 2006/0279807 A1 | * | 12/2006 | Kung | .................. H04N 1/1017 358/494 |
| 2014/0009747 A1 | | 1/2014 | Suzuki et al. | |
| 2014/0034817 A1 | | 2/2014 | Nakamura et al. | |
| 2014/0036071 A1 | | 2/2014 | Nakamura et al. | |
| 2014/0209793 A1 | | 7/2014 | Nakamura et al. | |
| 2015/0124238 A1 | | 5/2015 | Sakai et al. | |
| 2015/0160341 A1 | | 6/2015 | Akatsu et al. | |

FOREIGN PATENT DOCUMENTS

| | | | | |
|---|---|---|---|---|
| EP | 2808708 A1 | 12/2014 | | |
| GB | 2220502 A | * | 1/1990 | ......... B23K 26/0732 |
| JP | 2009-103529 | 5/2009 | | |
| JP | 2014-032149 | 2/2014 | | |
| JP | 2014-232265 | 12/2014 | | |
| JP | 2014-235075 | 12/2014 | | |

OTHER PUBLICATIONS

U.S. Appl. No. 14/658,650, filed Mar. 16, 2015.

* cited by examiner

*Primary Examiner* — Thanh Luu
(74) *Attorney, Agent, or Firm* — Oblon, McClelland, Maier & Neustadt, L.L.P.

(57) ABSTRACT

A projection optical system includes a light source to emit light and an optical element including an incidence plane on which the light from the light source is incident and an emission plane having a plurality of flat planes to emit the light, wherein the plurality of flat planes includes a first inclination plane inclining in a direction of the light-emitting surface.

14 Claims, 26 Drawing Sheets

FIG.6
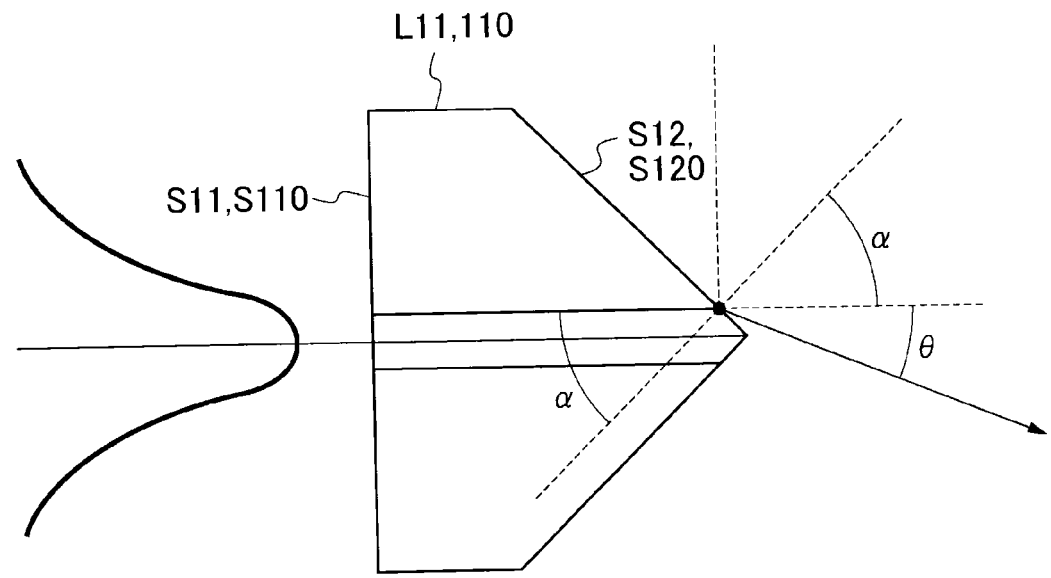
FIG.7
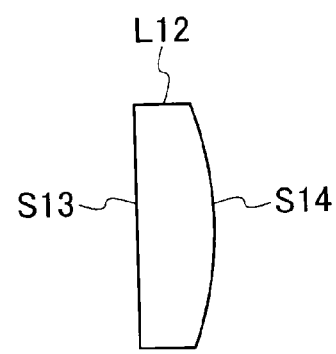
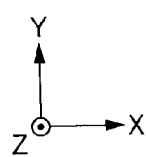

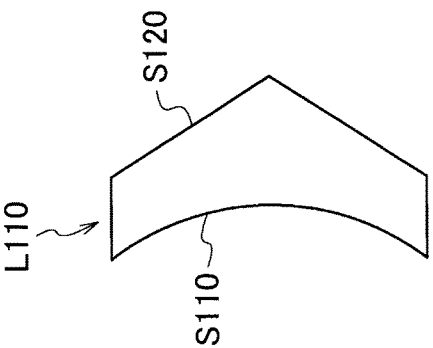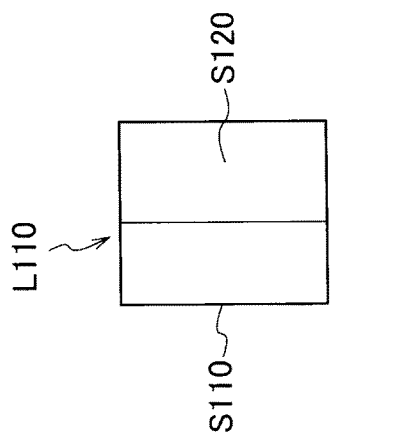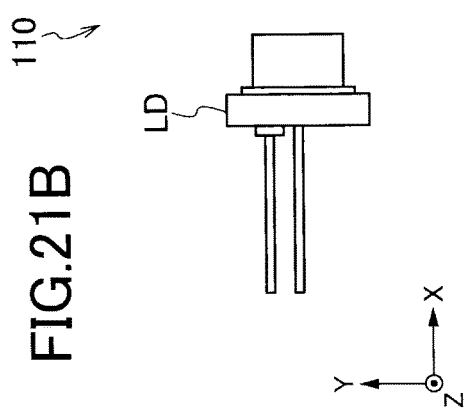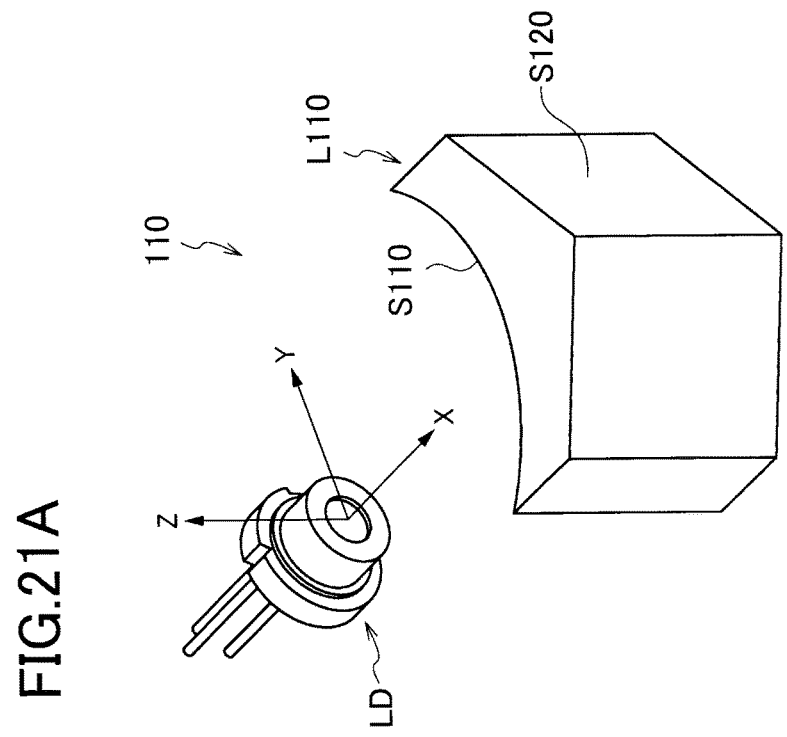

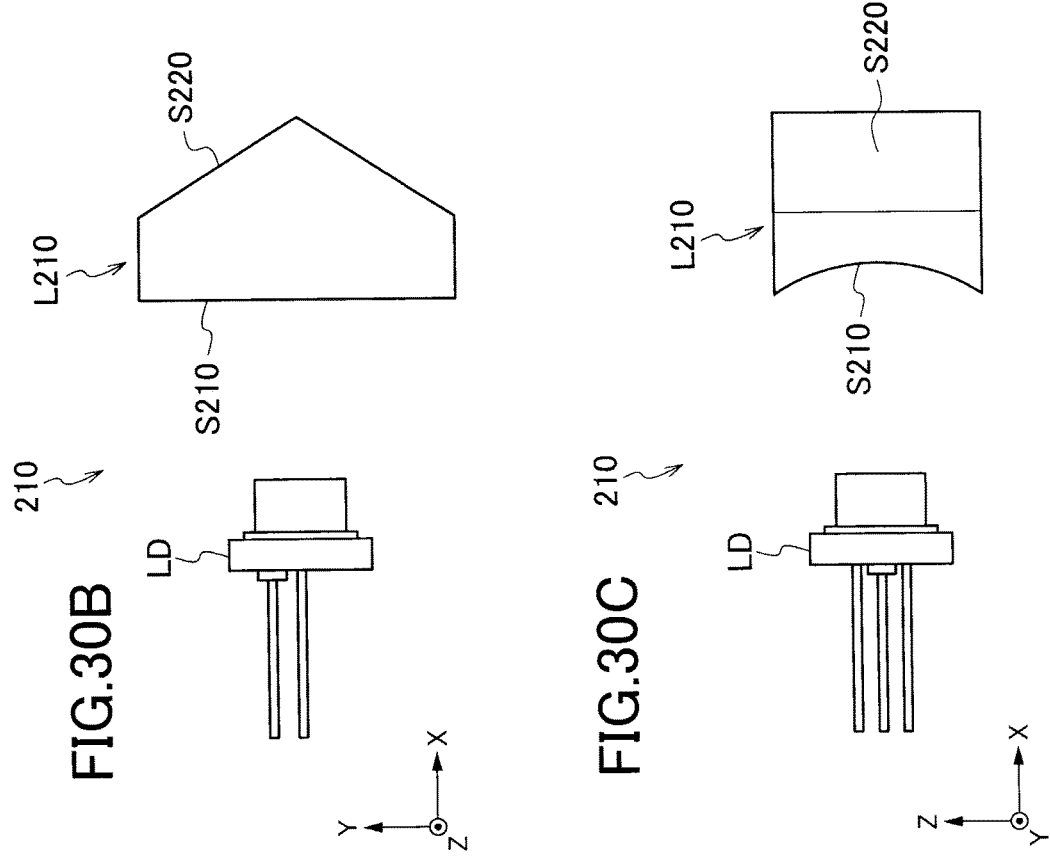
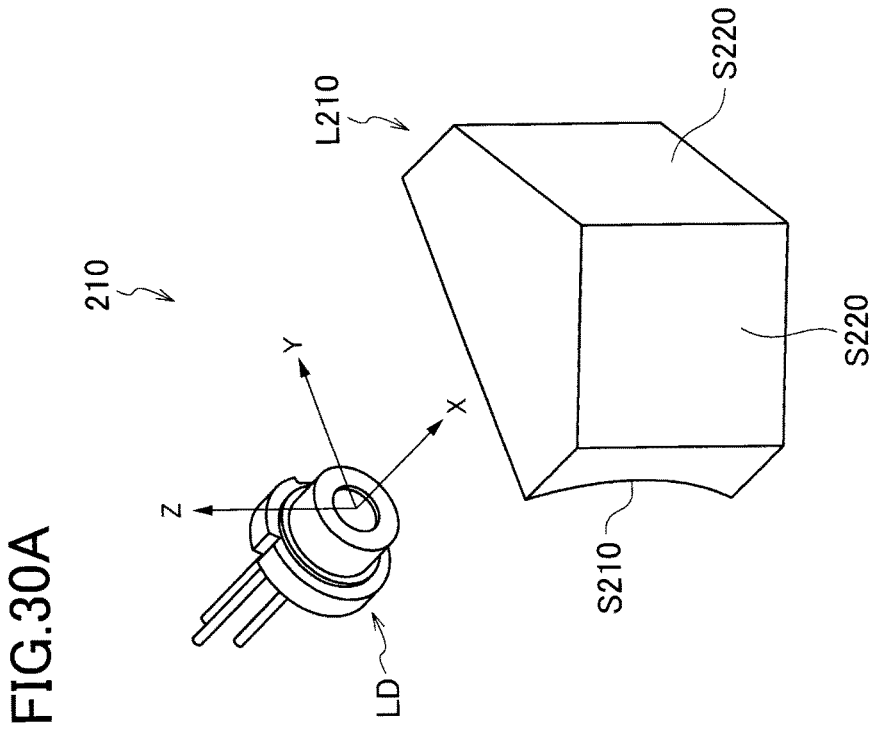
FIG.30A
FIG.30B
FIG.30C

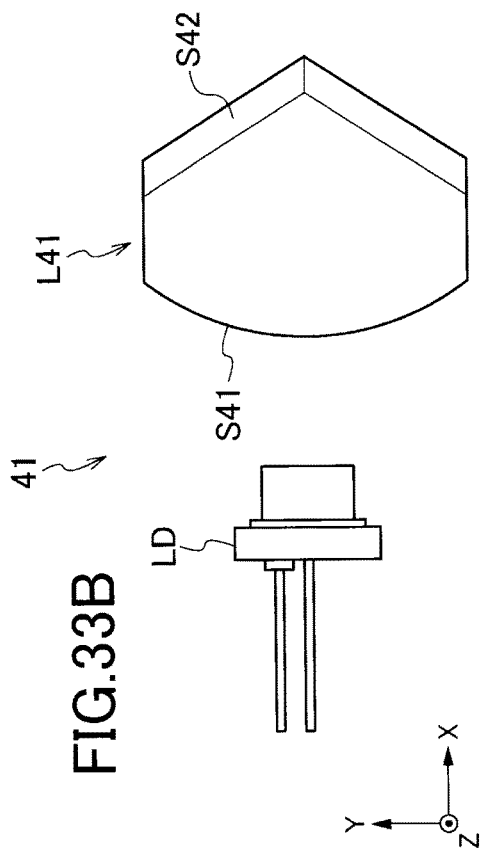
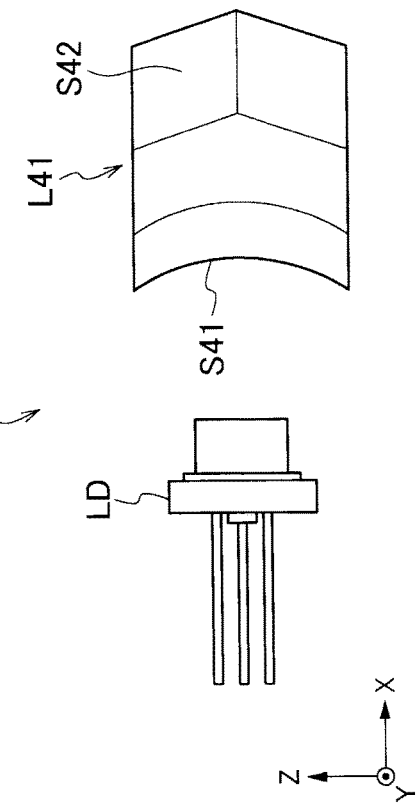
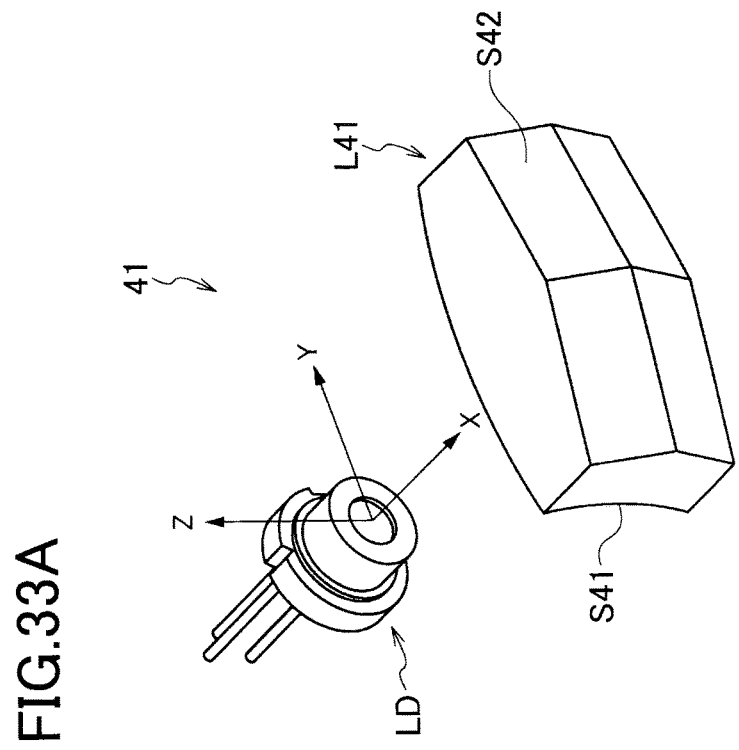
FIG.33A
FIG.33B
FIG.33C

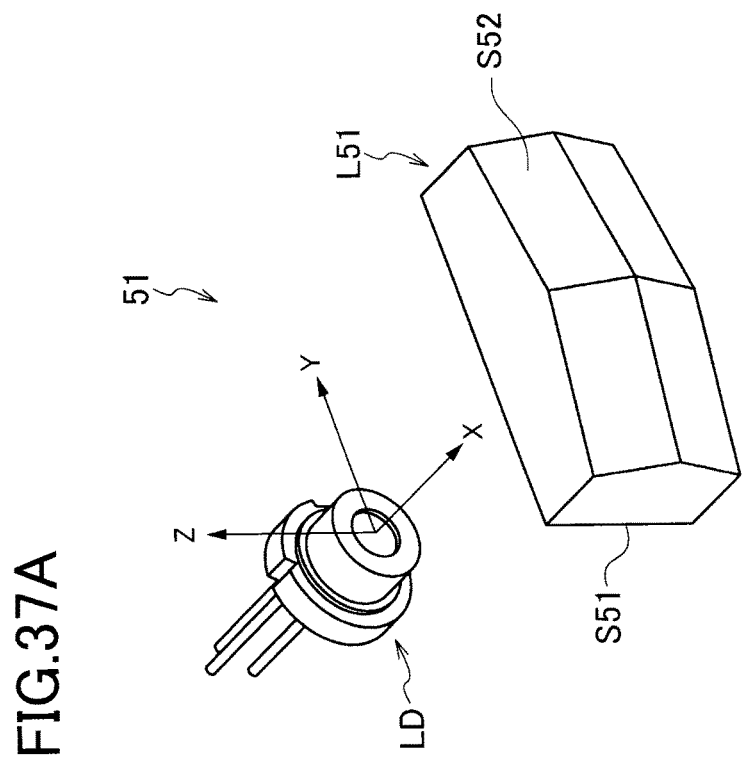
FIG.37A
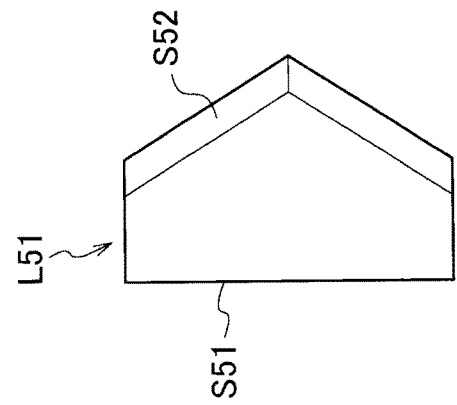
FIG.37B
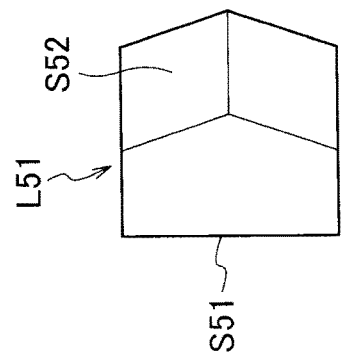
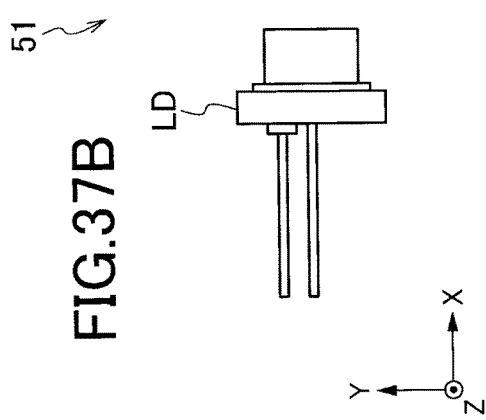
FIG.37C
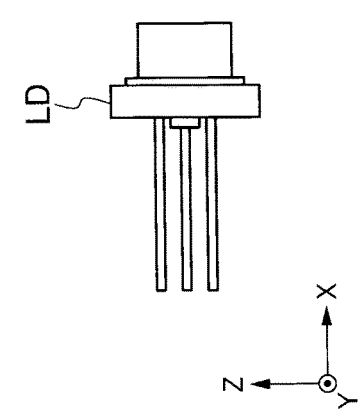

PROJECTION OPTICAL SYSTEM AND OBJECT DETECTION DEVICE

CROSS-REFERENCE TO RELATED APPLICATION

The present application is based on and claims priority from Japanese Patent Application Number 2014-205741, filed Oct. 6, 2014, the disclosure of which is hereby incorporated by reference herein its entirety.

BACKGROUND

Field of the Invention

The present invention relates to a projection optical system and an object detection device.

Description of the Related Art

An object detection device that determines existence or non-existence of an object and measures a distance to the object has been known. Such an object detection device includes a projection optical system having a light source and an incident optical system that changes a light beam from the light source to irradiate the object as a detection target.

A laser radar for a vehicle has been known as one example of the object detection device. Such a laser radar detects existence or non-existence of an object in front of a traveling vehicle and measures a distance to the object.

The laser radar irradiates the object with laser light emitted from a light source through an incident optical system. The laser radar detects the light reflected or scattered by the object with a light detector to detect the existence or non-existence of the object in a desired range and to measure the distance to the object.

A laser radar capable of scanning a desired range by alternately turning on a plurality of light sources arranged in the scanning direction without having a deflector and a scanner such as a rotation mirror is taught by JP 2009-103529A as one example.

SUMMARY

However, it is not taught by JP 2009-103529A to project a light beam to a projection region with a desired intensity distribution (including uniform intensity distribution) by the operation of the optical element.

The present invention aims to provide an optical element capable projecting a light beam to a projection region with a desired intensity distribution.

To achieve the above object, an aspect of the present invention provides a projection optical system including a light source to emit light and an optical element including an incidence plane on which the light from the light source is incident and an emission plane having a plurality of flat planes to emit the light, wherein when one direction parallel to a light-emitting surface of the light source is defined as a first direction, a direction having a right angle to the first direction which is a direction parallel to the light-emitting surface is defined as a second direction, directions having the right angle to both of the first direction and the second direction are defined as third directions, and an angle range to emit light having predetermined emission intensity or more in a predetermined direction is defined as a divergent angle, the light emitted from the light source has a first divergent angle in the first direction with the third direction as a center and a second divergent angle in the second direction with the third direction as a center, and the plurality of flat planes includes a first inclination plane inclining in a direction of the light-emitting surface in the first direction.

BRIEF DESCRIPTION OF THE DRAWINGS

FIG. 6 is a view describing a shape of an emission plane of the optical element according to the embodiments of the present invention, FIG. 7 is an x-y plane view illustrating a shape of a second optical element according to the first embodiment of the present invention, FIGS. 33A, 33B, and 33C are views illustrating a projection optical system according to a sixth embodiment of the present invention.

DETAILED DESCRIPTION

Hereinafter, a projection optical system and an object detection device according to embodiments of the present invention will be described with reference to the drawings.

Embodiment 1

At first, an object detection device according to a first embodiment of the present invention will be described.

Figure 1:
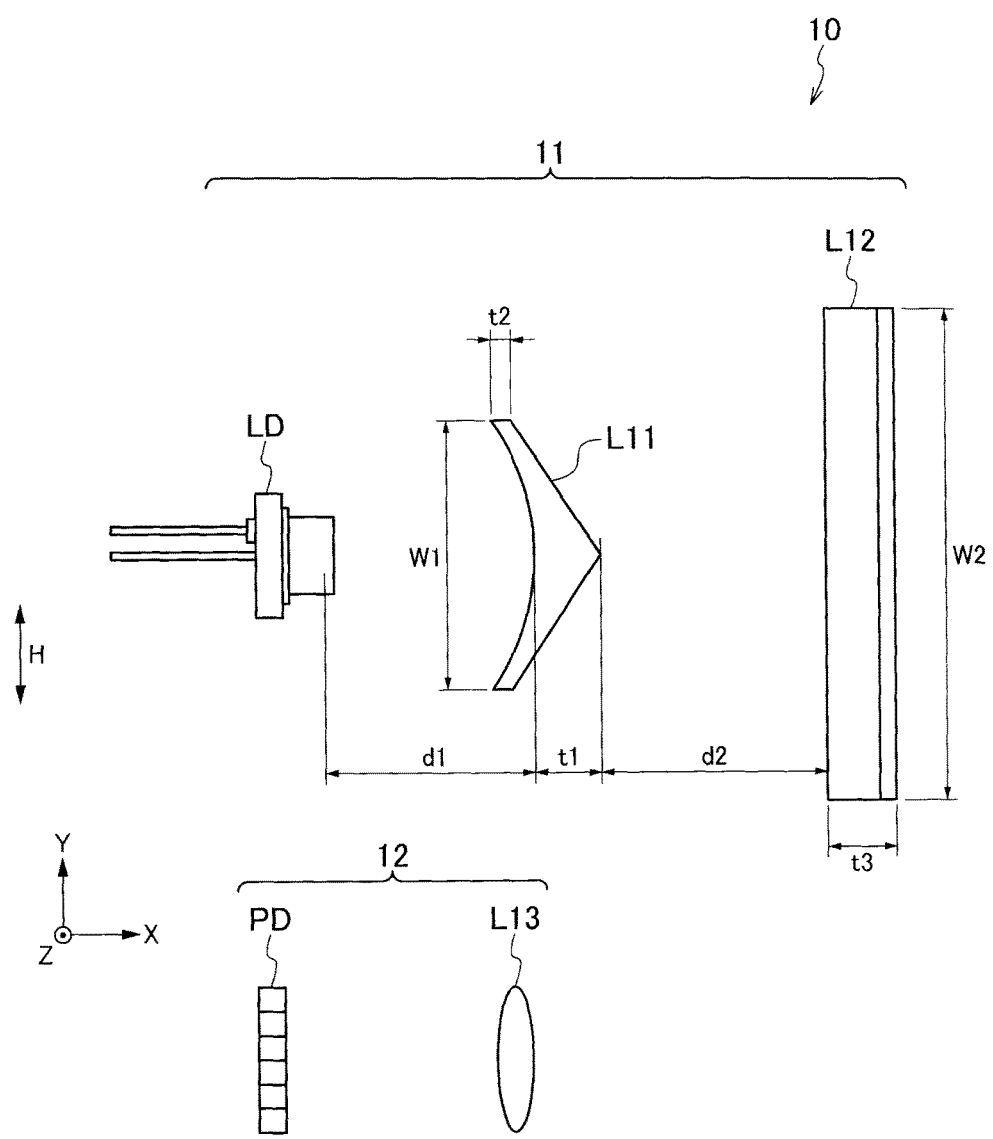
FIG. 1 is an x-y plane view illustrating an object detection device according to a first embodiment of the present invention.
Figure 2:
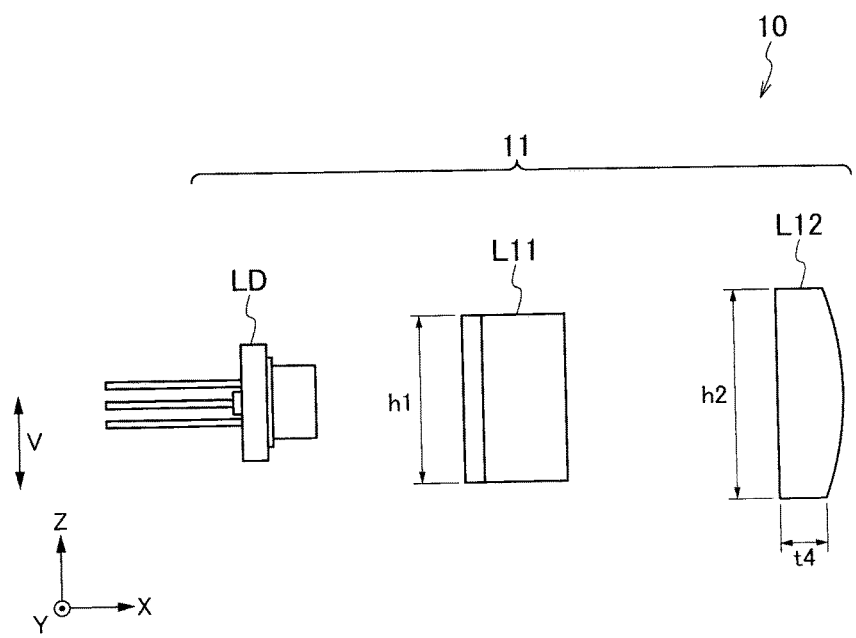
FIG. 2 is a z-x plane view illustrating the object detection device in FIG. 1.

FIG. 1 is an x-y plane view illustrating the object detection device according to the first embodiment of the present invention. FIG. 2 is a z-y plane view of the object detection device in FIG. 1. As illustrated in FIGS. 1 and 2, an object detection device 10 includes a projection optical system 11 and a light-receiving optical system 12.

Referring to FIG. 1, an X-axis corresponds to a direction in which a light beam (light flux) is emitted from a laser diode LD and axes orthogonal to the X-axis correspond to a Y-axis and a Z-axis, respectively. A Y-axis direction corresponds to the horizontal direction and a Z-axis direction corresponds to the vertical axis direction in FIG. 1.

Figure 3:
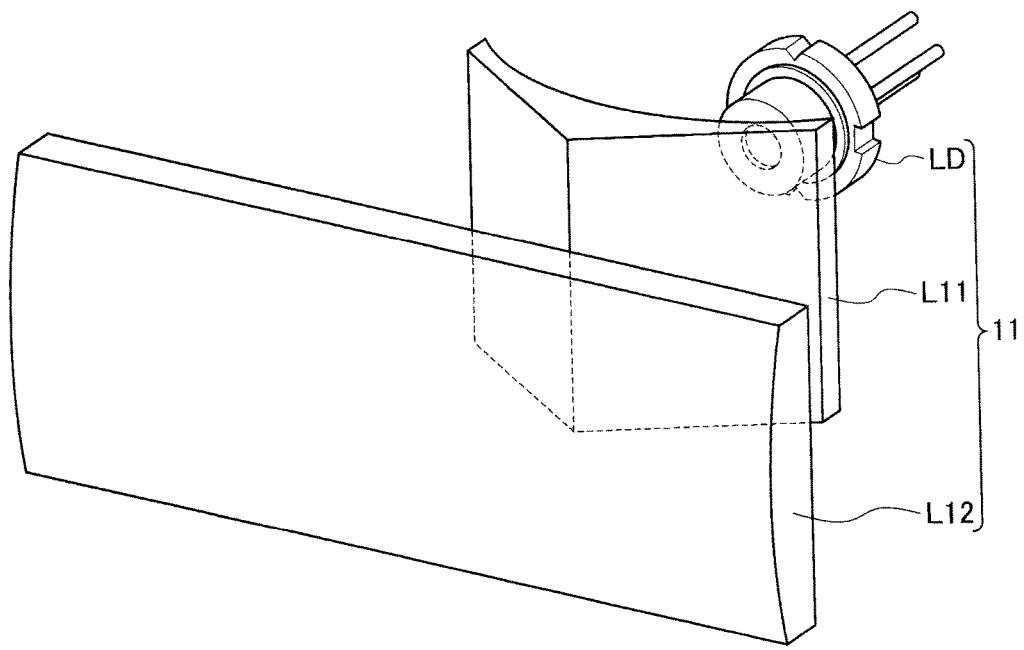
FIG. 3 is a perspective view illustrating a projection optical system according to the first embodiment of the present invention.

FIG. 3 is a perspective view illustrating the projection optical system 11 according to the first embodiment of the present invention. The projection optical system 11 includes the laser diode LD, a first optical element L11 and a second optical element L12.

The projection optical system 11 changes the light beam emitted from the laser diode LD to irradiate an object as a detection target with the light beam.

Hereinafter, the arrangement of the projection optical system 11 will be described with reference to FIG. 1. In the projection optical system 11, a distance d1 from an emission point of the laser diode LD to an incidence plane of the first optical element L11 is 10 mm and a distance d2 from an emission plane of the first optical element L11 to an incidence plane of the second optical element L12 is 10 mm.

Next, a dimension of the first optical element L11 will be described with reference to FIGS. 1 and 2. The first optical element L11 has a center thickness t1 of 3 mm, an edge thickness t2 of 1.1 mm, a horizontal external dimension w1 of 12 mm, a vertical external dimension h1 of 8 mm, and a curvature radius of the incidence plane of −10 mm.

Next, a dimension of the second optical element L12 will be described with reference to FIGS. 1 and 2. The second optical element L12 includes a center thickness t3 of 3 mm, an edge thickness t4 of 2.3 mm, a horizontal external dimension w2 of 22 mm, a vertical external dimension h2 of 10 mm, and a curvature radius of the emission plane of −18 mm.

The light-receiving optical system 12 includes a photodiode PD and a third optical element L13.

Next, the structure of the projection optical system 11 will be described.

The laser diode LD is one example of a light source. The laser diode LD emits light with a Gaussian distribution. The laser diode LD has an emission wavelength suitable for detecting an object, for example, an infrared range of 905 nm.

Figure 4:
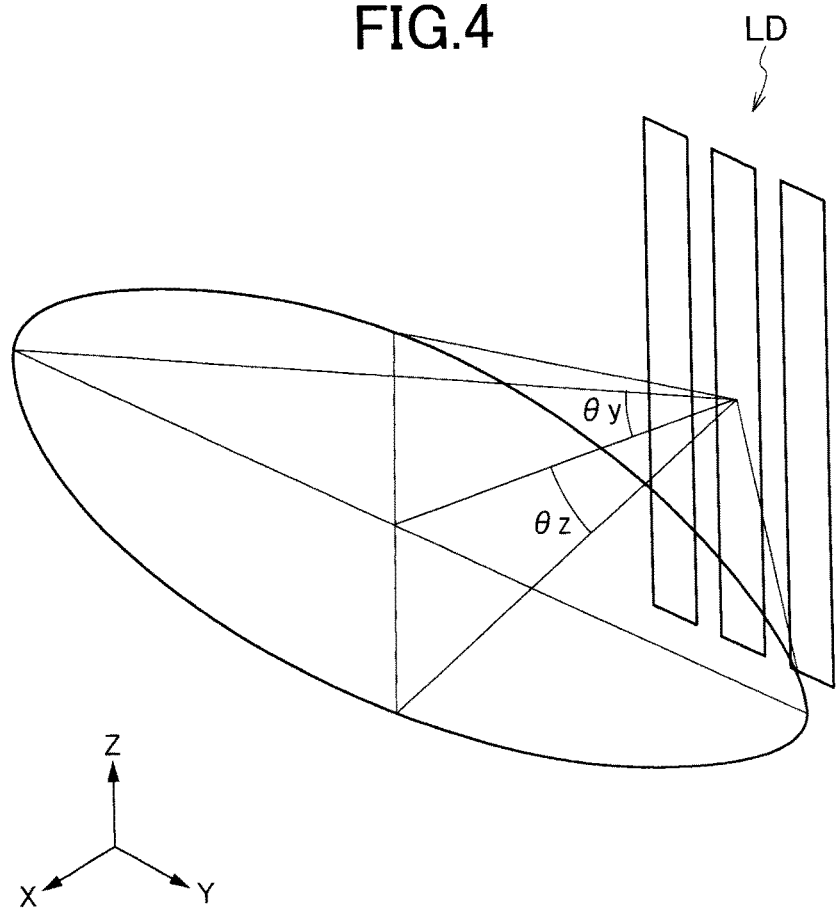
FIG. 4 is a diagram illustrating a laser diode according to embodiments of the present invention.

FIG. 4 is a diagram illustrating the laser diode LD. The laser diode LD differs in a diffusion angle between the horizontal direction (Y-axis direction) and the vertical direction (Z-axis direction). As illustrated in FIG. 4, the laser diode LD has the diffusion angle in the horizontal direction (Y-axis direction) larger than that in the vertical direction (Z-axis direction).

The laser diode LD may have the diffusion angle in the horizontal direction (Y-axis direction) smaller than that in the vertical direction (Z-axis direction). The laser diode LD may have a plurality of light emitters or a single light emitter.

Next, the first optical element L11 as an optical element will be described.

The projection optical system 11 is required to irradiate the object with the light beam from the laser diode LD while widely diffusing the light beam in the horizontal direction with a uniform intensity distribution in an effective irradiation range for detecting the object. In this case, the effective irradiation range is a range (region) to which the light beam from the projection optical system 11 is irradiated at a predetermined distance with a predetermined emission intensity.

The irradiation with the uniform intensity distribution means that a variation in the emission intensity is within a predetermined range with no emission intensity peak in the effective irradiation range.

When irradiating the effective irradiation range with the light beam with the uniform intensity distribution, the first optical element L11 is required to cover the light volume deficiency in a region (outer portion of effective irradiation range) having an angle from the center portion of the effective irradiation range while diffusing the light beam in the horizontal direction.

Figure 5:
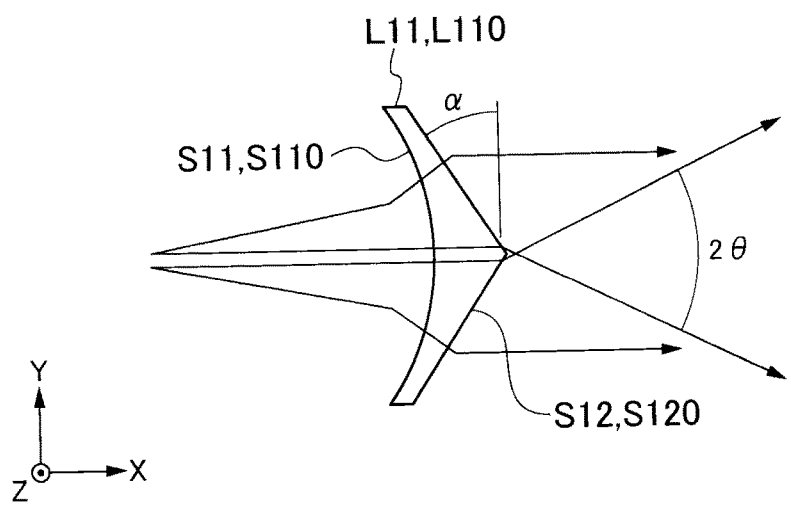
FIG. 5 is an x-y plane view illustrating an optical element as a first optical element according to the embodiments of the present invention.

FIG. 5 is an x-y plane view illustrating the first optical element L11. The shape of the first optical element L11 is determined based on the relationship between the irradiation range of the laser diode LD and an effective object detection range (effective irradiation range) required by the first optical element L11.

The first optical element L11 includes an incidence plane S11 and an emission plane S12. The incidence plane S11 and the emission plane S12 have a refractive power only in one direction (horizontal direction in this embodiment). The incidence plane S11 and the emission plane S12 have the same shape in one direction (vertical direction in this embodiment).

The profile of the incidence plane S11 such as the basic shape (concave plane, convex plane, and flat plane) and the curvature radius is appropriately set based on the divergent angle of the light beam incident on the incidence plane S11 and the effective irradiation range of the light beam emitted from the emission plane S12. In addition, the incidence plane S11 may have a curved plane such as an aspheric plane.

The incidence plane S11 has a concave plane relative to the laser diode LD to cover the light volume deficiency of the outer portion of the effective irradiation range by deflecting the light beam irradiated from the laser diode LD in the emission center direction.

The emission plane S12 has a plurality of flat planes (for example, two planes) jointed to each other. The emission plane S12 has a shape such as a globe roof with the jointed portions of the flat planes as an edge line. The emission plane S12 having such a shape emits the light from the laser diode LD including the light near the emission center of the laser diode LD in one direction (horizontal direction in this embodiment).

FIG. 6 is a view describing the shape of the emission plane S12. As illustrated in FIG. 6, the jointed angle of the emission plane S12 is set such that the end portion of the effective irradiation range at a predetermined distance is irradiated with the light beam from the laser diode LD incident on the jointed portion of the two flat planes of the emission plane S12.

The shape of the emission plane S12 is expressed by the following equation (1) where an angle between each flat plane of the emission plane and an plane orthogonal to the traveling direction of the light incident on the incidence plane is a, a half angle of an irradiation angle from the emission center to the end portion of the effective irradiation range at a predetermined distance is θ, a refractive index of the first optical element is n, and a refractive index of a medium except the first optical element is n'.

$$n \cdot \sin \alpha = n' \cdot \sin(\alpha + \theta) = n'(\sin \alpha \cdot \cos \theta + \sin \theta \cdot \cos \alpha) \quad (1)$$

The following equation (2) is obtained when the equation (1) is expanded.

$$(n - n' \cdot \cos \theta) \cdot \sin \alpha = n'(\sin \theta \cdot \cos \alpha) \quad (2)$$

When the result of the equation (2) is substituted into tan $\alpha = \sin \alpha / \cos \alpha$, the following equation (3) is obtained.

$$\tan \alpha = \sin \alpha / \cos \alpha = n' \cdot \sin \theta / n - n' \cdot \cos \theta \quad (3)$$

Namely, the shape of the emission plane S12 is expressed by the following equation (4) based on the equations (2) and (3).

$$\alpha = \tan^{-1}(n' \cdot \sin \theta / n - n' \cdot \cos \theta) \quad (4)$$

When the medium except the first optical element is air, the refractive index n'=1. The equation (4) is thus the following equation (4-1).

$$\alpha = \tan^{-1}(\sin \theta / n - \cos \theta) \quad (4\text{-}1)$$

Next, the relationship between the shapes of the incidence plane S11 and the emission plane S12 will be described with reference to the following Table 1.

In the following Table 1, "○" denotes that the incidence plane or the emission plane has a shape that changes the traveling direction of the light beam incident on the incidence plane or the emission plane and "—" denotes that the incidence plane or the emission plane has no shape that changes the traveling direction of the light beam incident on the incidence plane or the emission plane (similar to the following Tables 2 and 3).

TABLE 1

| PLANE | INCIDENT PLANE | | | | EMISSION PLANE | | | |
|---|---|---|---|---|---|---|---|---|
| HORIZONTAL DIRECTION | ○ | — | ○ | — | ○ | — | — | ○ |
| VERTICAL DIRECTION | — | ○ | ○ | — | — | ○ | ○ | |
| PATTERN OF COMBINATION OF SHAPE | A | B | C | D | X | Y | Z | |

As shown in Table 1, A, B, C, and D denote the combinations of the shapes that change the traveling direction of the light beam incident on the incidence plane S11 and X, Y, and Z denote the combinations of the shapes that change the traveling direction of the light beam incident on the emission plane S12.

The combination of the existence or non-existence of the refractive power between the incidence plane S11 and the emission plane S12 can be selected from the twelve combinations of A-X, A-Y, A-Z, B-X, B-Y, B-Z, C-X, C-Y, C-Z, D-X, D-Y, and D-Z.

FIG. 7 is an x-y plane view illustrating an example of the shape of the second optical element L12. The second optical element L12 receives the light beam emitted from the first optical element L11 to irradiate the effective irradiation range with the light beam. The second optical element L12 is a cylindrical lens having a refractive power in a direction different from that of the first optical element L11.

The second optical element L12 covers the refractive power of the first optical element L11 to adjust the emission intensity distribution for irradiating the the effective irradiation range with the light beam with a desired intensity distribution. The second optical element L12 therefore has the refractive power at least in one of the horizontal direction and the vertical direction. In FIG. 7, the second optical element L12 has the refractive power in the Y-axis direction.

The shape of the second optical element L12 is not limited to the above shape. The second optical element L12 can be any shape as long as it has a shape that covers the refractive power of the first optical element L11 to adjust the emission intensity distribution.

The second optical element L12 includes an incidence plane S13 having a flat plane and an emission plane S14 having a convex plane. The incidence plane S13 and the emission plane S14 have the same shape in one direction (Y-axis direction).

The shapes of the incidence plane S13 and the emission plane S14 of the second optical element L12 are not limited to the above. The incidence plane S13 may have a concave plane.

Next, the relationship between the shapes of the first optical element L11 and the second optical element will be described with reference to the following Table 2.

TABLE 2

| | OPTICAL ELEMENT | | | | | | |
|---|---|---|---|---|---|---|---|
| | FIRST OPTICAL ELEMENT | | | | SECOND OPTICAL ELEMENT | | |
| HORIZONTAL DIRECTION | ○ | — | ○ | — | — | ○ | ○ |
| VERTICAL DIRECTION | — | ○ | ○ | — | ○ | — | ○ |
| PATTERN OF COMBINATION IN DIRECTION HAVING CONDENSING POWER | P | Q | R | S | T | U | V |

As shown in Table 2, P, Q, R, and S denote the combinations of the shapes having the condensing power of the first optical element L11 in the horizontal direction and the vertical direction and T, U, and V denote the combinations of the shapes having the condensing power of the second optical element L12 in the horizontal direction and the vertical direction.

The combination of the shape having the condensing power of the first optical element L11 and the shape having the condensing power of the second optical element L12 can be selected from the twelve combinations of P-T, P-U, P-V, Q-T, Q-U, Q-V, R-T, R-U, R-V, S-T, S-U, and S-V.

Figure 8:
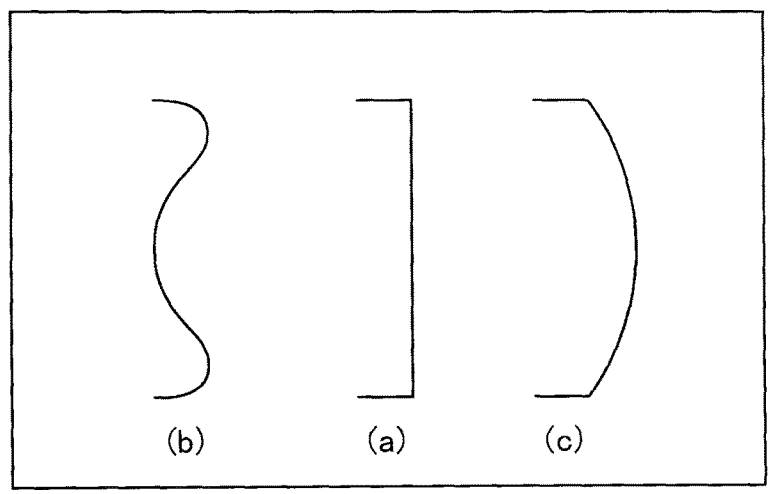
FIG. 8 is a diagram illustrating one example of an intensity distribution of light projected by the projection optical system.

FIG. 8 is a diagram illustrating one example of an intensity distribution of the light irradiated by the projection optical system 11. In FIG. 8, the vertical axis shows the angle from the emission center in the effective irradiation range and the horizontal axis shows the emission intensity.

Referring to FIG. 8, the projection optical system 11 can achieve the uniform intensity distribution in the effective irradiation range as shown by (a). The projection optical system 11 can enhance the emission intensity of the end portion of the effective irradiation range as shown by (b) and enhance the emission intensity of the center portion of the effective irradiation range as shown by (c). Namely, the projection optical system 11 can achieve a desired intensity distribution as shown by (b) and (c) according to a required specification.

The projection optical system 11 can therefore achieve the desired intensity distribution including the uniform intensity distribution in the effective irradiation range.

Next, the structure of the light-receiving optical system 12 will be described. The third optical element L13 receives the light beam reflected or scattered by the object in the effective irradiation range, and forms an image on the light-receiving plane of the photodiode PD.

The photodiode PD is a light detector that receives the light beam reflected or scattered by the object in the effective irradiation range and imaged by the third optical element L13 to detect the object in the effective irradiation range.

In addition, an APD (Avalanche Photo Diode) and a normal PD (Pin Photo Diode) can be used for the photodiode PD.

Figure 9:
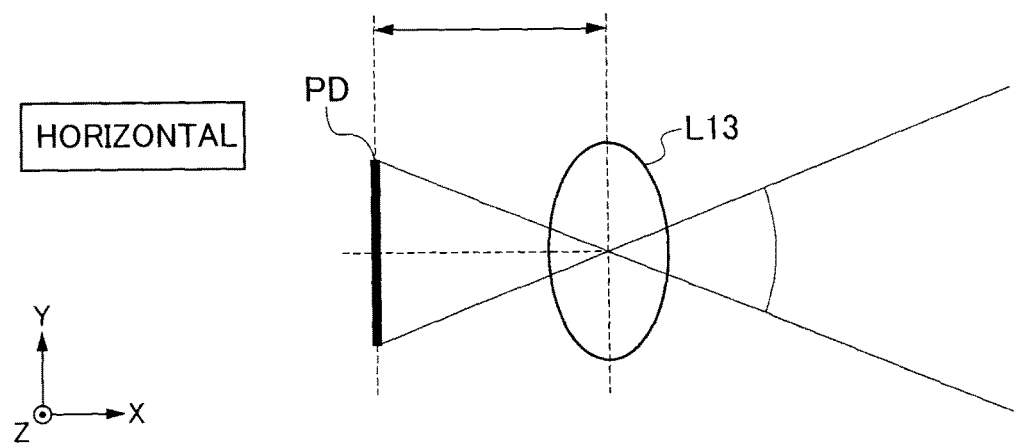
FIG. 9 is an x-y plane view illustrating a light-receiving area of a light-receiving optical system of the object detection device in FIG. 1.
Figure 10:
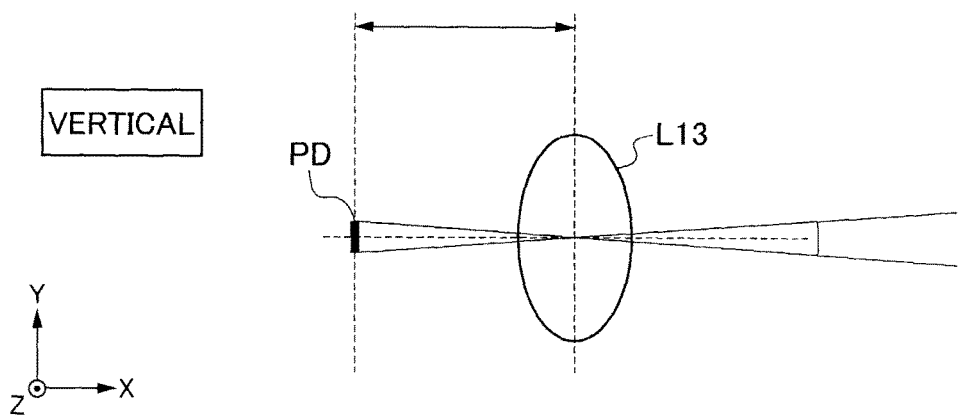
FIG. 10 is a y-z plane view illustrating the light-receiving area of the light-receiving optical system in FIG. 9.

FIG. 9 is an x-y plane view illustrating a light-receiving area of the light-receiving optical system 12. FIG. 10 is a y-z plane view illustrating the light-receiving area of the light-receiving optical system 12. In FIGS. 9 and 10, the photodiode PD includes a plurality of photodiodes arranged in array. As illustrated in FIGS. 9 and 10, since the photodiode PD has a sensor horizontal width wider than a sensor vertical width, the photodiode PD has a light-receiving angle (light-receiving area) in the horizontal direction larger (wider) than a light-receiving angle in the vertical direction.

Figure 11:
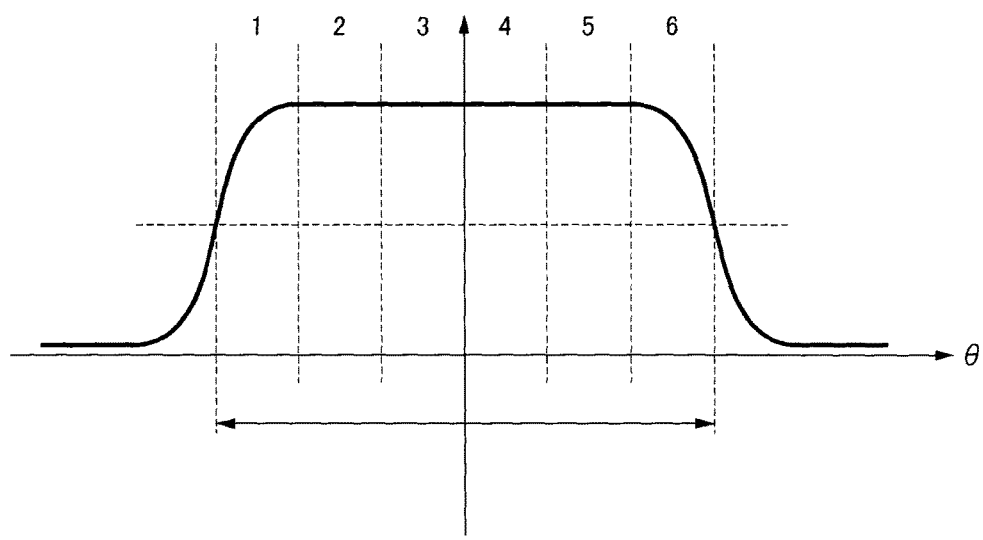
FIG. 11 is a diagram illustrating a relationship between the intensity distribution of the light projected by the projection optical system and the light-receiving area of a photodiode.

FIG. 11 is a diagram showing the relationship between the intensity distribution of the light projected by the projection optical system 11 and the light-receiving area of the photodiode PD. As illustrated in FIG. 11, the photodiode PD can specify the reflection position of the reflected light from the effective irradiation range by dividing the light-receiving area respect to each array.

Embodiment 2

Next, a projection optical system according to a second embodiment of the present invention will be described based on a difference between the projection optical system according to the second embodiment and the projection optical system according to the first embodiment.

Figure 12:
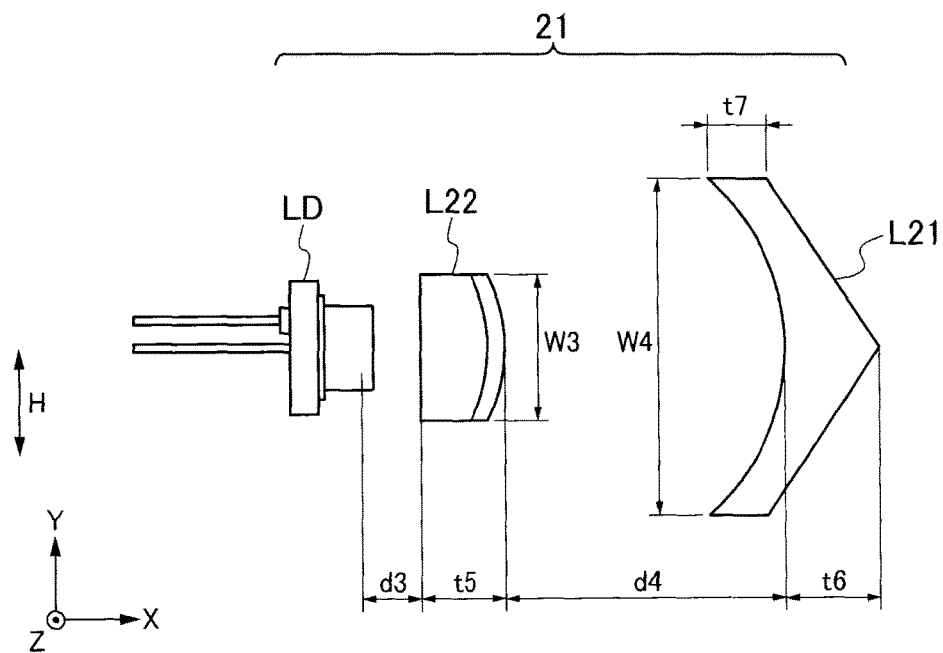
FIG. 12 is an x-y plane view illustrating a projection optical system according to a second embodiment of the present invention.
Figure 13:
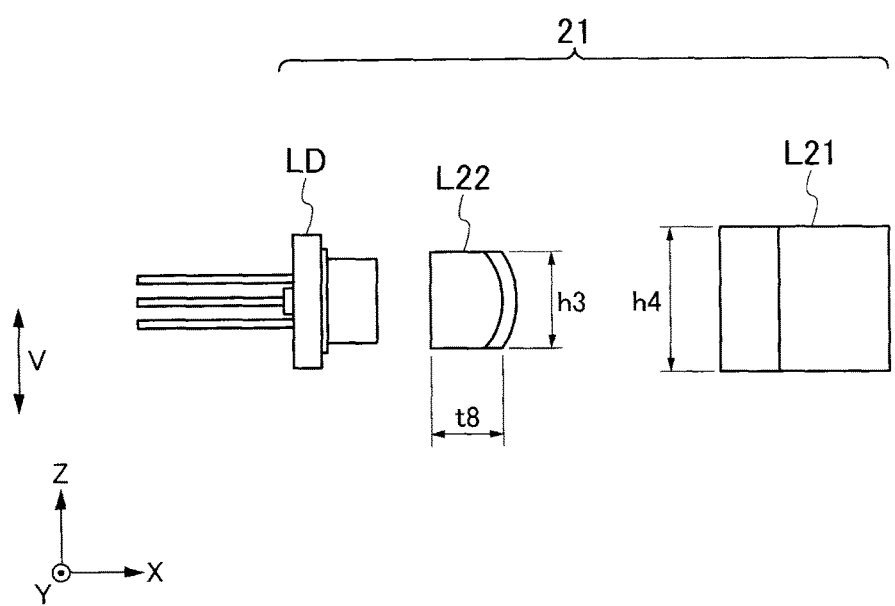
FIG. 13 is a z-x plane view illustrating the projection optical system in FIG. 12.
Figure 14:
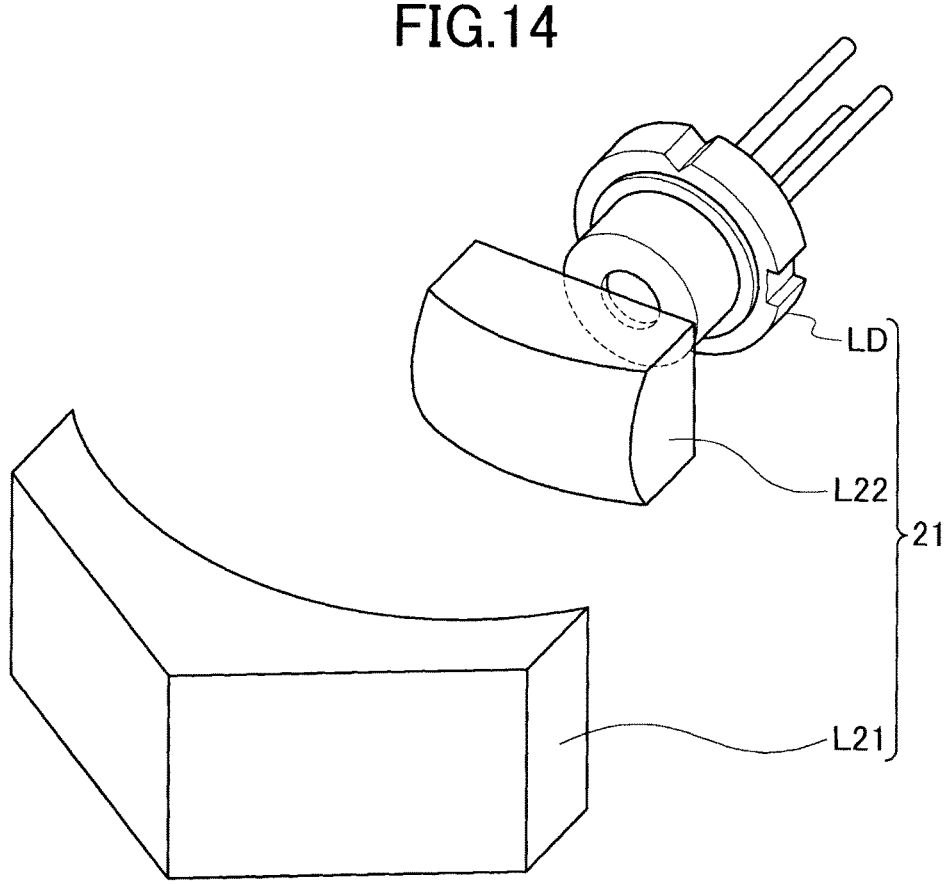
FIG. 14 is a perspective view illustrating the projection optical system in FIG. 12.

FIG. 12 is an x-y plane view illustrating the projection optical system according to the second embodiment of the present invention. FIG. 13 is a z-x plane view illustrating the projection optical system in FIG. 12. FIG. 14 is a perspective view illustrating the projection optical system in FIG. 12. As illustrated in FIGS. 12, 13, and 14, the arrangement of a first optical element L21 and a second optical element L22 in a projection optical system 21 differs from those in the projection optical system 11 according to the first embodiment of the present invention.

Namely, the second optical element L22 shapes the light beam from the laser diode LD in the projection optical system 21. Then, the first optical element L21 shapes the light beam emitted from the second optical element L22 to generate a desired intensity distribution including a uniform intensity distribution in the effective irradiation range.

Hereinafter, the arrangement of the projection optical system 21 will be described with reference to FIG. 12. In the projection optical system 21, a distance d3 from the emission point of the laser diode LD to the incidence plane of the second optical element L22 is 3 mm and a distance d4 from the emission plane of the second optical element L22 to the incidence plane of the first optical element L21 is 11.5 mm.

Next, the dimension of the first optical element L21 will be described with reference to FIGS. 12 and 13. The first optical element L21 has a center thickness t6 of 4 mm, an edge thickness t7 of 2.1 mm, a horizontal external dimension w4 of 14 mm, a vertical external dimension h4 of 6 mm, and a curvature radius of the incidence plane of −9 mm.

Next, the dimension of the second optical element L22 will be described with reference to FIGS. 12 and 13. The second optical element L22 has a center thickness t5 of 3.5 mm, an edge thickness t8 of 2.1 mm, a horizontal external dimension w3 of 6 mm, a vertical external dimension h3 of 4 mm, and a curvature radius of an emission plane in a horizontal plane of −7.5 mm and in a vertical plane of −3.5 mm.

Next, the first optical element L21 will be described.

Figure 15:
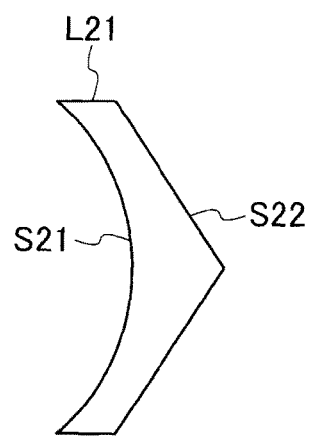
FIG. 15 is an x-y plan view illustrating an optical element of the projection optical system in FIG. 12.

FIG. 15 is an x-y plane view illustrating the first optical element L21 according to the second embodiment of the present invention. The shape of the first optical element L21 is determined based on the relationship between the light beam shaped by the second optical element L22 and the effective object detection range (effective irradiation range) required by the first optical element L21.

Similar to the first optical element according to the first embodiment of the present invention, the first optical element L21 is required to cover the light volume deficiency in a region (outside portion of effective irradiation range) having an angle from the center portion of the effective irradiation range while diffusing the light beam in the horizontal direction.

The first optical element L21 includes an incidence plane S21 and an emission plane S22. The incidence plane S21 and the emission plane S22 have a shape that changes the traveling direction of the light beam only in one direction (horizontal direction in this embodiment). Namely, the incidence plane S21 and the emission plane S22 have the same shape in one direction (vertical direction in this embodiment).

The profile of the incidence plane S21 such as the basic shape and the curvature radius is appropriately set based on the divergent angle of the light beam incident on the incidence plane S21 and the effective irradiation range of the light beam emitted from the emission plane S22, similar to the first optical element L11 according to the first embodiment of the present invention. The incidence plane S21 may have a curved plane such as an aspheric plane.

The incidence plane S21 has a concave plane relative to the second optical element L22 to cover the light volume deficiency of the outer portion of the effective irradiation range by deflecting the light beam incident from the second optical element L22 in the emission center direction.

The emission plane S22 has a plurality of flat planes (for example two flat planes) jointed to each other, similar to the above-described first optical element L11 according to the first embodiment of the present invention. This emission plane S22 having such a shape emits the light beam from the second optical element L22 in one direction (horizontal direction in this embodiment).

The shape of the emission plane S22 can be expressed by the following equation (4), similar to the first optical element L11 according to the first embodiment of the present invention.

$$\alpha = \tan^{-1}(\sin\theta/n - n' \cdot \cos\theta) \quad (4)$$

Next the relationship between the shapes of the incidence plane S21 and the emission plane S22 will be described. The combination of the shapes of the incidence plane S21 and the emission plane S22 can be selected from the twelve combinations of A-X, A-Y, A-Z, B-X, B-Y, B-Z, C-X, C-Y, C-Z, D-X, D-Y, and D-Z shown in Table 1, similar to the first optical element L11 according to the first embodiment of the present invention.

Figure 16:
FIG. 16 is an x-y plane view illustrating a second optical element of the projection optical system in FIG. 12.

FIG. 16 is an x-y plane view illustrating the second optical element L22 of the projection optical system 21. The light beam emitted from the laser diode LD is incident on the second optical element L22. The second optical element L22 emits the shaped light beam to be incident on the first optical element L21. The second optical element L22 is a toroidal lens having a refractive power in a plurality of directions. In addition, the second optical element L22 can be any shape as long as it has a shape which emits the light from the laser diode LD to be effectively reached to the first optical element L21.

Since the second optical element L22 irradiates the effective irradiation range with the light beam with the desired intensity distribution, the second optical element L22 covers the refractive power of the first optical element L21 to adjust the emission intensity distribution. It is therefore desirable for the second optical element L22 to have a refractive power both in the horizontal direction and the vertical direction.

The incidence plane S23 has, for example, a flat plane and the emission plane S24 has, for example, a convex plane having a different curvature radius between the horizontal direction and the vertical direction.

The shapes of the incidence plane S23 and the emission plane S24 are not limited thereto. The incidence plane S23 may have a concave plane.

Next, the relationship between the shapes of the first optical element L21 and the second optical element L22 will be described with reference to the following Table 3.

TABLE 3

| | OPTICAL ELEMENT | | | | | | |
|---|---|---|---|---|---|---|---|
| | FIRST OPTICAL ELEMENT | | | | SECOND OPTICAL ELEMENT | | |
| HORIZONTAL DIRECTION | ○ | — | ○ | — | — | ○ | ○ |
| VERTICAL DIRECTION | — | ○ | ○ | — | ○ | — | ○ |
| PATTERN OF COMBINATION IN DIRECTION HAVING CONDENSING POWER | P | Q | R | S | T | U | V |

As shown in Table 3, P, Q, R, and S denote the combinations of the shapes of the first optical element L21 having the condensing power in the horizontal direction and the vertical direction in the projection optical system 21 and T, U, and V denote the combinations of the shapes of the second optical element L22 having the condensing power in the horizontal direction and the vertical direction in the projection optical system 21.

The combinations of the shape of the first optical element L21 having the condensing power and the shape of the second optical element L22 having the condensing power can be selected from the twelve combinations of P-T, P-U, P-V, Q-T, Q-U, Q-V, R-T, R-U, R-V, S-T, S-U, and S-V.

The projection optical system 21 can achieve the uniform intensity distribution in the effective irradiation range as shown by (a) in FIG. 8, similar to the projection optical system 11 according to the first embodiment. The projection optical system 21 can enhance the emission intensity of the edge portion of the effective irradiation range as shown by (b) in FIG. 8 and enhance the emission intensity of the center portion of the effective irradiation range as shown by (c) in FIG. 8. The projection optical system 21 can irradiate the light beam with a desired intensity distribution as shown by (b) and (c) in FIG. 8 according to a required specification.

The projection optical system 21 therefore can generate the desired intensity distribution including the uniform intensity distribution in the effective irradiation range.

Next, a change in the intensity distribution by the shape of the incidence plane of the first optical element L11 will be described.

Figure 17:
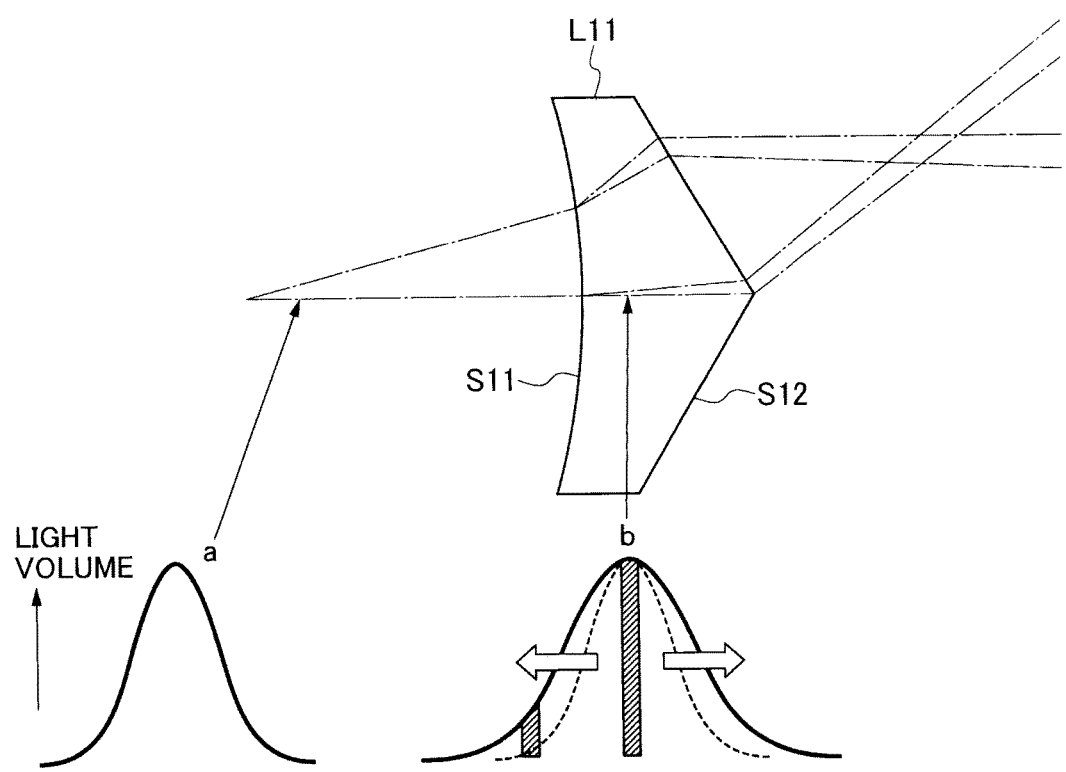
FIG. 17 is a diagram illustrating a change in the intensity distribution of the light beam before the incidence on the first optical element of the projection optical system and a change in the intensity distribution of the light beam after the incidence on the incidence plane of the first optical element.

FIG. 17 is a diagram illustrating a change in the intensity distribution of the light beam before the incidence on the first optical element L11 and a change in the intensity distribution of the light beam after the incidence on the incidence plane S11. As illustrated in FIG. 17, comparing the intensity distribution a of the light beam before the incidence on the first optical element L11 to the intensity distribution b of the light beam after the incidence on the incidence plane S11, the intensity distribution b has an angle range wider than that of the intensity distribution a.

Figure 18:
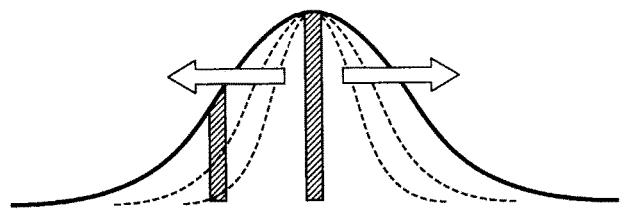
FIG. 18 is a diagram illustrating the intensity distribution of the light beam emitted from the first optical element of the projection optical system.

FIG. 18 is a diagram illustrating the intensity distribution of the light beam emitted from the first optical element L11. As shown in FIG. 18, the light beam emitted from the first optical element L11 expands the emission intensity distribution to be a wide angle range. The first optical element L11 can generate the desired intensity distribution by changing the condensing power of the incidence plane S11 to change the light volume near the emission center.

Next, a comparative example of the optical element according to the first and the second embodiments of the present invention will be described.

Figure 19:
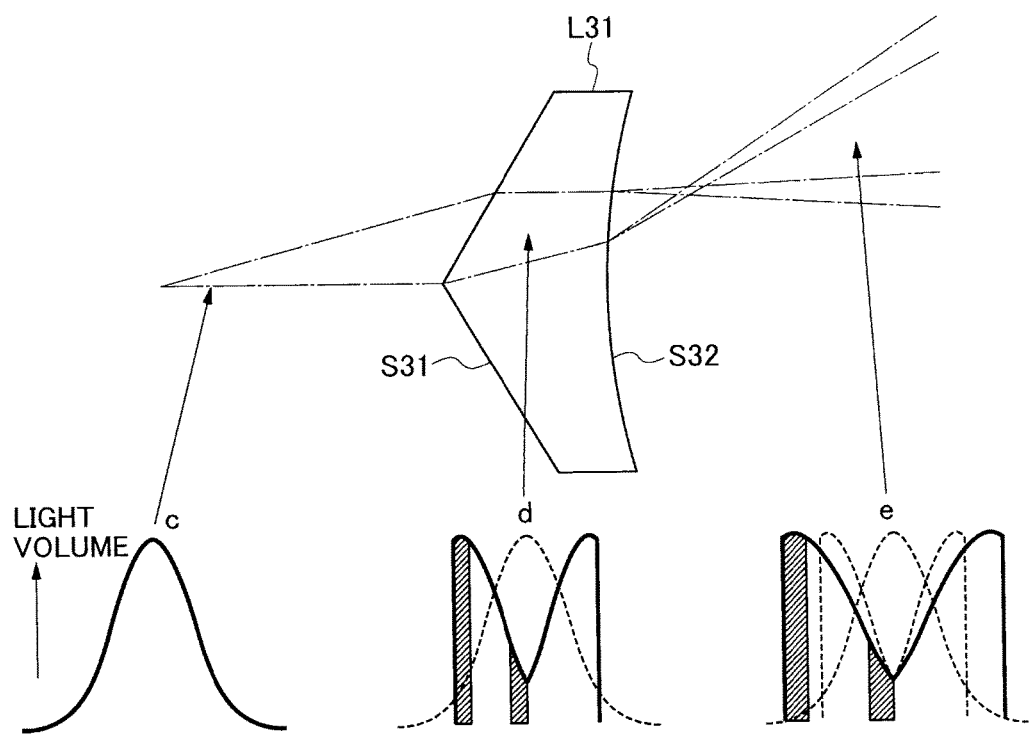
FIG. 19 is an x-y plane view illustrating an optical element according to a comparative example.

FIG. 19 is an x-y plane illustrating an optical element according to the comparative example. As illustrated in FIG. 19, an optical element L31 in the comparative example has on the laser diode LD side a plane having a shape which is the same as that of the emission plane S12 of the first optical element L11 according to the first embodiment.

Namely, an incidence plane S31 of the optical element L31 has a shape which is the same as that of the emission plane S12 of the first optical element L11 according to the first embodiment and the emission plane S32 of the first optical element L31 has a shape which is the same as that of the incidence plane S11 of the first optical element L11 according the first embodiment.

FIG. 19 shows an intensity distribution c of the light beam before the incidence on the optical element L31, an intensity distribution d of the light beam after the incidence on the incidence plane S31, and am intensity distribution e of the light beam after the emission from the emission plane S32. Comparing the intensity distributions c, d, and e, in the intensity distribution e of the light beam after the emission from the emission plane S32, the intensity distribution increases in the circumference portion of the effective irradiation range.

Figure 20:
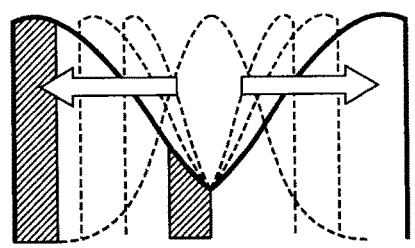
FIG. 20 is a diagram illustrating an intensity distribution of a light beam emitted from the optical element in FIG. 19, FIGS. 21A, 21B, and 21C are views illustrating a projection optical system according to a third embodiment of the present invention.

FIG. 20 is a diagram showing the intensity distribution of the light beam emitted from the optical element L31. As shown in FIG. 20, the optical element L31 cannot generate the uniform intensity distribution in the effective irradiation range and cannot obtain the desired intensity distribution.

Embodiment 3

Next, a projection optical system according to a third embodiment of the present invention will be described.

FIGS. 21A to 21C are views each illustrating the projection optical system according to the third embodiment of the present invention. FIG. 21A is a perspective view, FIG. 21B is an x-y plane view, and FIG. 21C is an x-z plane view. As illustrated in FIGS. 21A to 21C, a projection optical system 110 includes a laser diode LD having a light-emitting surface to emit light and an optical element L110. The projection optical system 110 changes the light beam emitted from the laser diode LD to irradiate an object as a detection target with the light beam. In the projection optical system 110, the distance from the emission point of the laser diode LD to the incidence plane of the optical element L110 is 10 mm.

The laser diode LD is one example of the light source. The light source in this embodiment can be any light source such as an electroluminescence light source as long as it has a light-emitting surface (surface emission) having a predetermined area. The laser diode LD includes an emission wavelength suitable for detecting an object such as an infrared region of 905 nm, for example.

In the following description, an X-axis corresponds to a direction in which the light beam (light flux) is emitted from the laser diode LD and the axes orthogonal to the X-axis are a Y-axis and a Z-axis, respectively. A Y-axis direction corresponds to the horizontal direction and a Z-axis direction corresponds to the vertical direction. An X-axis direction corresponds to a third direction which is a direction having a right angle relative to the light-emitting surface of the laser diode LD. The Y-axis direction and the Z-axis direction correspond to a first direction or a second direction which is a direction parallel to the light-emitting surface. In the following description, the Y-axis direction corresponds to the first direction and the Z-axis direction correspond to the second direction.

The laser diode LD has the strongest intensity of the light traveling in the right angle direction (+X-axis direction) from the light-emitting surface. The laser diode LD emits the light with Gaussian distribution intensity as an angle increases in a predetermined direction (Y-axis direction and Z-axis direction) with the +X-axis as the center. In this embodiment, the divergent angle is an angle range for emitting light with a predetermined emission intensity (for example, half intensity to peak intensity) of the emission intensity showing Gaussian distribution, namely, a full width at half maximum when drawing an intensity relative to an angle.

As illustrated in FIG. 4, the divergent angle $\theta y$ of the laser diode LD in the horizontal direction (Y-axis direction) differs from the divergent angle $\theta z$ of the laser diode LD in the vertical direction (Z-axis direction). The divergent angle $\theta y$ in the horizontal direction is larger than the divergent angle $\theta z$ in the vertical direction. The divergent angle is inversely proportional to the size of the emission region diameter (dimension of emission region).

The laser diode LD may have the divergent angle $\theta y$ in the horizontal direction smaller than the divergent angle $\theta z$ in the vertical direction. The laser diode LD may have a plurality of light emitters or a single light emitter.

Next, the optical element L110 will be described.

The projection optical system 110 is required to irradiate an object with the light beam from the laser diode LD in the effective irradiation range while widely diffusing the light beam in the horizontal direction with a uniform intensity distribution. In this case, the effective irradiation range is a range (region) where the light beam by the projection optical system 110 is irradiated at a predetermined distance with predetermined emission intensity.

The irradiation with the uniform intensity distribution means that a variation in the emission intensity is within a predetermined range with no emission intensity peak in the effective irradiation range.

More specifically, when the light beam is irradiated to the effective irradiation range with the uniform intensity distribution, the optical element L110 is required to cover the light volume deficiency in the region (outer portion of effective irradiation range) having an angle from the center portion in the effective irradiation range while diffusing the light beam in the horizontal direction.

As illustrated in FIG. 5, the shape of the optical element L110 is determined based on the relationship between the irradiation range of the laser diode LD and the effective object detection range (effective irradiation range) required by the optical element L11.

The optical element L110 includes an incidence plane S110 and an emission plane S120. The incidence plane S110 has a refractive power only in one direction (Y-axis direction in this embodiment) and does not have a refractive power in the Z-axis direction. In this embodiment, the refractive power means an optical power that changes the emission level of the light from the laser diode LD, and does not mean an optical power that changes only the traveling direction of the light without changing the emission level of the light such as a prism. The incidence plane S110 and the emission plane S120 have the same shape in one direction (Z-axis direction in this embodiment). The optical element L110 may be disposed such that the inclination direction of the emission plane S120 of the optical element L110 is aligned with the direction of the first divergent angle θy of the laser diode LD.

The profile of the incidence plane S110 such as the basic shape (concave plane, convex plane, and flat plane) and the curvature radius is appropriately set based on the divergent angle of the light beam incident on the incidence plane S110 and the effective irradiation range of the light beam emitted from the emission plane S120.

As illustrated in FIG. 5, the incidence plane S110 has a concave plane relative to the laser diode LD to have a refractive power only in the Y-axis direction to cover the light volume deficiency of the outer region of the effective irradiation range by deflecting the light beam irradiated from the laser diode LD in the emission center direction. The curvature radius of the incidence plane S110 in the X-axis direction is, for example, −18 mm. The curvature radius has a positive value when the center of the curvature radius is on the positive side relative to the X-axis direction which is the traveling direction of the light beam and has a negative value when the center of the curvature radius is on the negative side relative to the X-axis direction. The incidence plane S110 may have an aspheric plane. The focal distance of the incidence plane S110 is −33.8 mm from the principal point of the optical element L110, which differs from a distance from the emission point to the principal point of the optical element.

The emission plane S120 includes a plurality of flat planes (for example, two flat plans) jointed to each other. In the example illustrated in FIG. 5, the emission plane S120 has a gable roof shape with the jointed portion of the two flat planes as an edge line. When the incidence plane S110 is arranged to face the light-emitting surface of the laser diode LD, a plurality of flat planes of the emission plane S120 is inclined in the direction of the light-emitting surface in the first direction. These flat planes may be called first inclination planes. With this shape, the emission plane S120 can change the traveling direction of the light to emit the light from the laser diode LD including the light near the emission center of the laser diode LD in the first direction (horizontal direction in this embodiment).

As illustrated in FIG. 6, the jointed angle of the emission plane S120 is set such that the light beam from the laser diode LD incident on the jointed portion of the two flat planes forming the emission plane S120 is irradiated to the end portion of the effective irradiation range at a predetermined distance.

The jointed angle of the emission plane S120 is, for example, 33° relative to the Y-axis. This jointed angle may be simply referred to as an inclination angle. The optical element L110 leads the light having strong emission intensity from the center portion of the laser diode LD to the circumference portion of the desired projection angle range while the optical element L110 leads the light having weak emission intensity from the circumference portion of the laser diode LD to the center portion of the desired projection angle range. In this embodiment, the laser diode LD has a divergent angle of 25° in the Y-axis direction and a divergent angle of 9° in the Z-axis direction.

Figure 22:
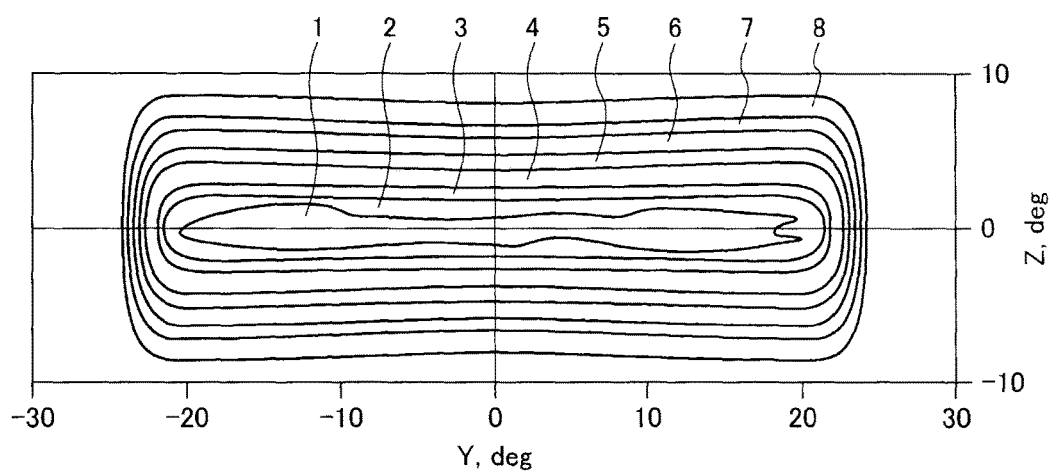
FIG. 22 is a diagram illustrating a light distribution pattern by the projection optical system in FIGS. 21A to 21C.
Figure 23:
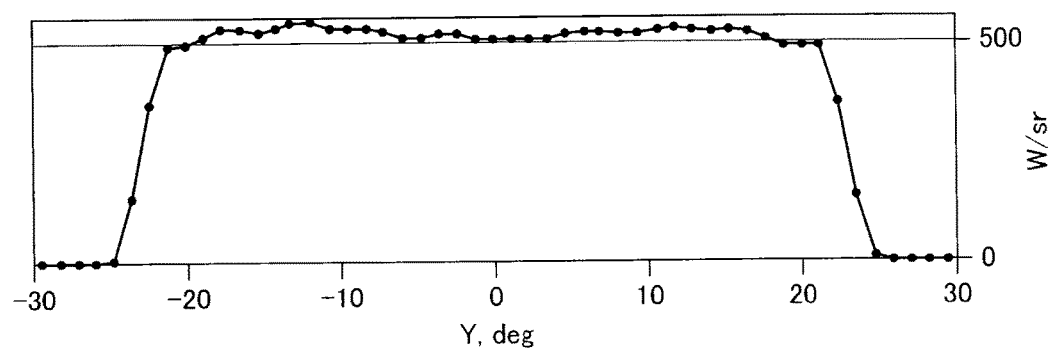
FIG. 23 is a diagram showing an emission intensity distribution pattern in the Y-axis direction in the light distribution pattern in FIG. 22.
Figure 24:
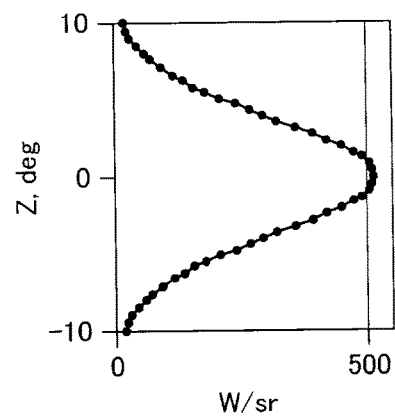
FIG. 24 is a diagram showing an emission intensity distribution pattern in the Z-axis direction in the light distribution pattern in FIG. 22, FIGS. 25A, 25B, and 25C are views illustrating one example of the projection optical system according to the third embodiment of the present invention.

FIG. 22 is a diagram showing a light distribution pattern by the projection optical system 110 in FIG. 5. In FIG. 22, reference numbers 1 to 8 show contours of emission intensity distributions in order from the inside. The emission intensity lowers in order as the contours from 1 to 8. FIG. 23 is a diagram showing the emission intensity distribution in the Y-axis direction in the light distribution pattern of FIG. 22. FIG. 24 is a diagram showing the emission intensity distribution in the Z-axis direction in the light distribution pattern of FIG. 22. As shown in FIGS. 22 to 24, the projection optical system 110 obtains a profile in which the emission intensity becomes an approximately constant in a range exceeding ±20° in the Y-axis direction.

The shape of the emission plane S120 is expressed by the following equation (1) where an angle between each flat plane of the emission plane and an plane orthogonal to the traveling direction of the light incident on the incidence plane is a, a half angle of an irradiation angle from the emission center to the end portion of the effective irradiation range at a predetermined distance is θ, a refractive index of the optical element is n, and a refractive index of a medium except the optical element is n'.

$$n \cdot \sin \alpha = n' \cdot \sin(\alpha+\theta) = n'(\sin \alpha \cdot \cos \theta + \sin \theta \cdot \cos \alpha) \quad (1)$$

The following equation (2) is obtained when the equation (1) is expanded.

$$(n - n' \cdot \cos \theta) \cdot \sin \alpha = \eta'(\sin \theta \cdot \cos \alpha) \quad (2)$$

When the result of the equation (2) is substituted into tan α=sin α/cos α, the following equation (3) is obtained.

$$\tan \alpha = \sin \alpha / \cos \alpha = n' \cdot \sin \theta / n - n' \cdot \cos \theta \quad (3)$$

Namely, the shape of the emission plane S12 is expressed by the following equation (4) based on the equations (2) and (3).

$$\alpha = \tan^{-1}(n' \cdot \sin \theta / n - n' \cdot \cos \theta) \quad (4)$$

When the medium except the first optical element is air, the refractive index n'=1. The equation (4) is thus the following equation (4-1).

$$\alpha = \tan^{-1}(\sin \theta / n - \cos \theta) \quad (4\text{-}1)$$

Figure 25A:
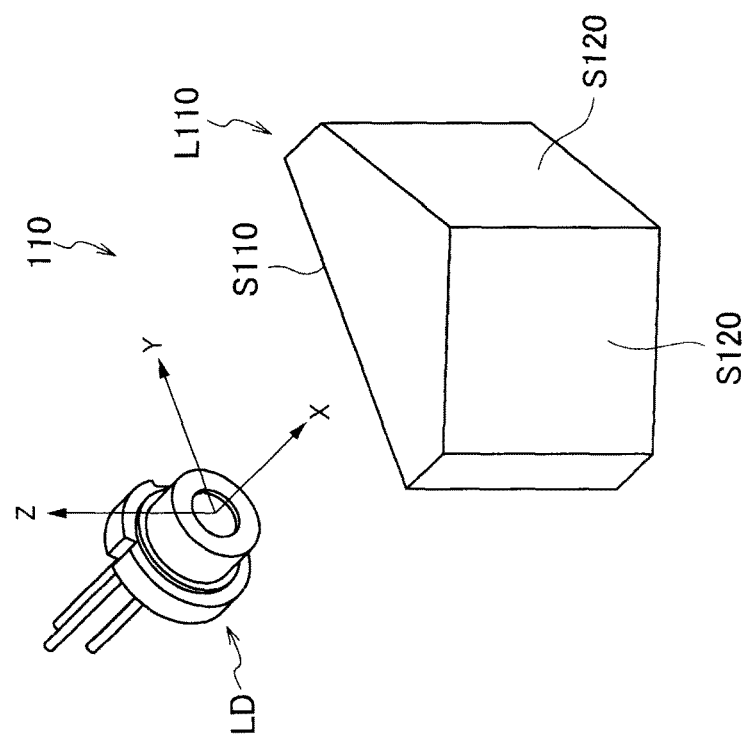
Figure 25B:
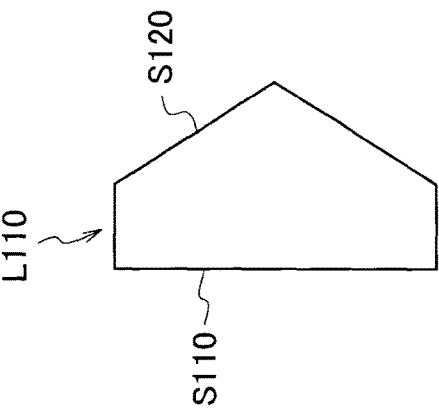
Figure 25C:
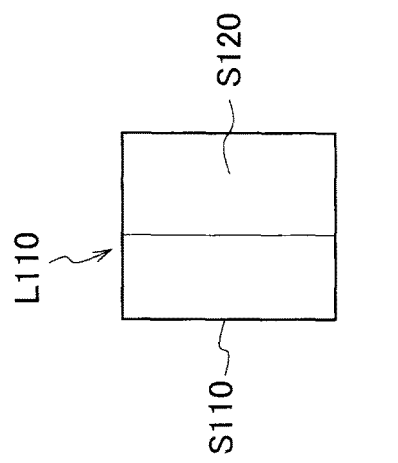

FIGS. 25A to 25C are views each illustrating one example of the projection optical system according to the third embodiment of the present invention. FIG. 25A is a perspective view, FIG. 25B is an x-y plane view, and FIG. 25C is an x-z plane view. As described above, the shape of the incidence plane S110 is set based on the divergent angle of the light beam incident on the incidence plane S110 and the effective irradiation range of the light beam emitted from the emission plane S120. The incidence plane S110 may have a flat plane without having a refractive power in both of the Y-axis direction and the Z-axis direction as illustrated in FIGS. 25A to 25C. With the flat incidence plane S110, a change in the projection angle range and the emission intensity distribution due to a variation in the position of the optical element L110 and the laser diode LD in the Y-axis direction and the Z-axis direction can be reduced.

Figure 26B:
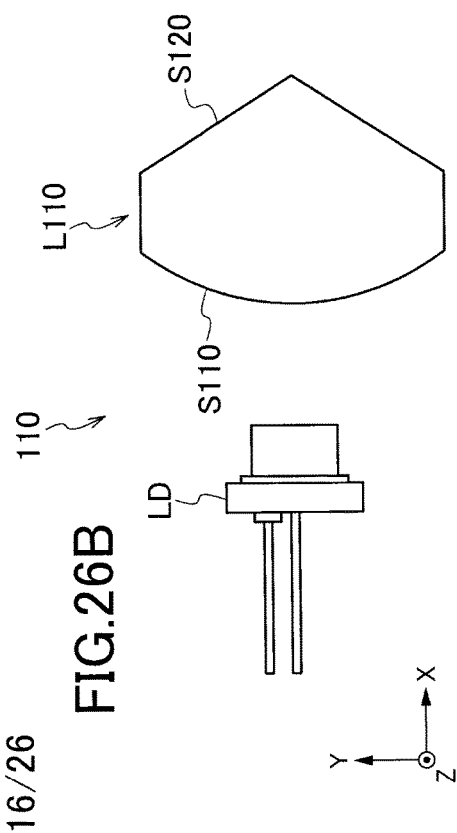
FIGS. 26A, 26B, and 26C are views illustrating one example of the projection optical system according the third embodiment of the present invention.
Figure 26C:
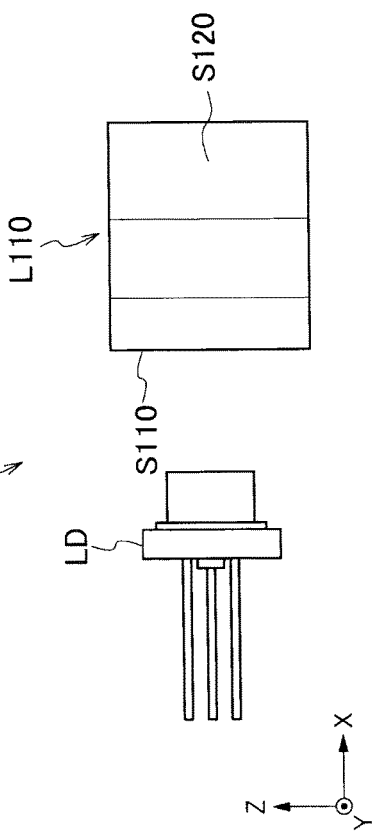
Figure 26A:
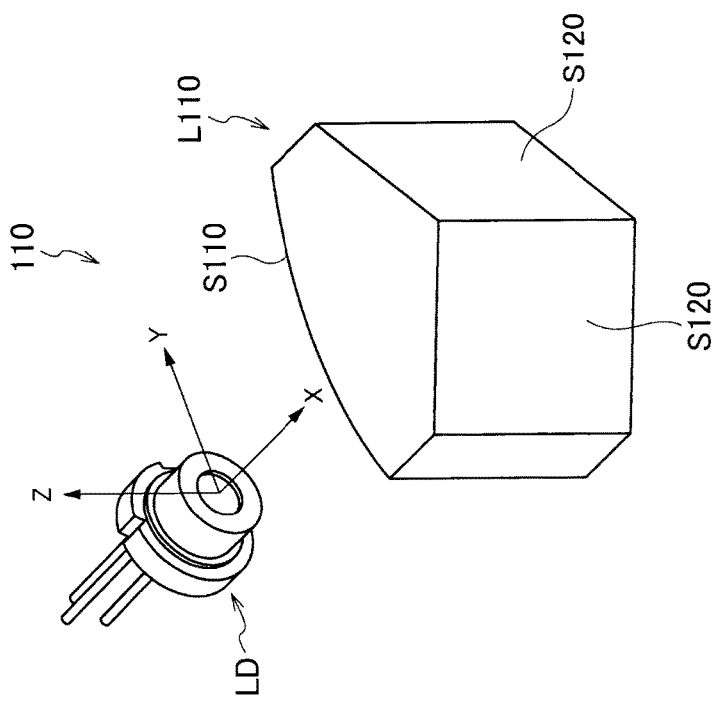

FIGS. 26A, 26B, and 26C are views each illustrating one example of the projection optical system according to the third embodiment of the present invention. FIG. 26A is a perspective view, FIG. 26B is an x-y plane view, and FIG. 26C is an x-z plane view. The incidence plane S110 may include a convex plane relative to the laser diode LD to have a refractive power only in the Y-axis direction to condense the light irradiated from the laser diode LD in the inner portion of the effective irradiation range. The focal distance of the incidence plane S110 is 37.5 mm from the principle point of the optical element L110, which differs from a distance from the emission point to the principle point of the optical element. The inclination angle of the emission plane S120 is 16° relative to the Y-axis.

Figure 27:
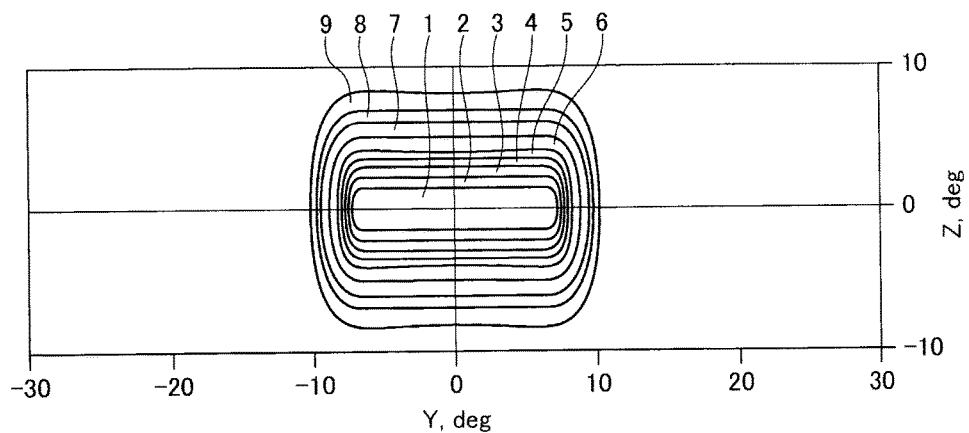
FIG. 27 is a diagram illustrating a light distribution pattern by the projection optical system in FIGS. 26A to 26C.
Figure 28:
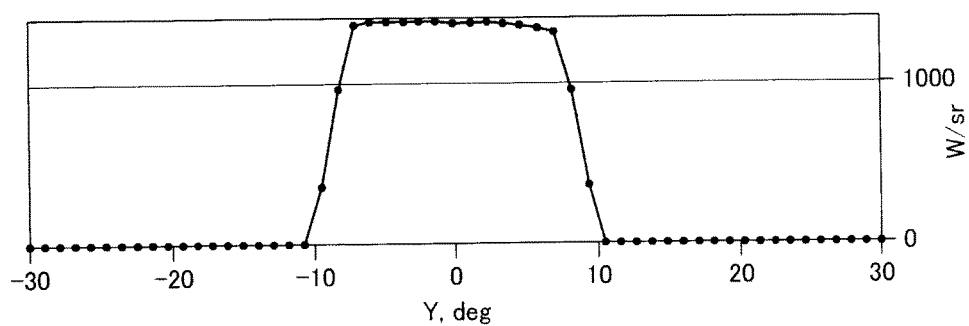
FIG. 28 is a diagram showing an emission intensity distribution pattern in the Y-axis direction in the light distribution pattern in FIG. 27.
Figure 29:
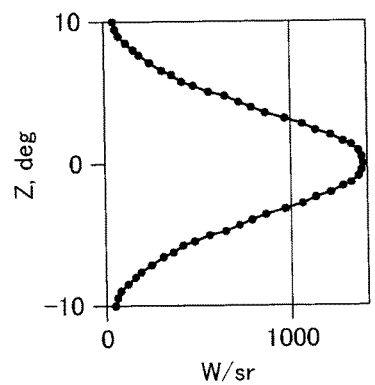
FIG. 29 is a diagram showing an emission intensity distribution pattern in the Z-axis direction in the light distribution pattern in FIG. 27, FIGS. 30A, 30B, and 30C are views illustrating a projection optical system according to a fourth embodiment of the present invention.

FIG. 27 is a diagram showing the light distribution pattern by the projection optical system 110 shown in FIGS. 26A to 26C. FIG. 28 is a diagram showing the emission intensity distribution in the Y-axis direction in the light distribution pattern of FIG. 27. FIG. 29 is a diagram showing the emission intensity distribution in the Z-axis direction in the light distribution pattern of FIG. 27. As shown in FIGS. 27 to 29, the projection optical system 110 shown in FIGS. 26A to 26C obtains a profile in which the emission intensity is an approximately constant in a range exceeding ±8° which is a range narrower than that of the projection optical system 110 in FIGS. 21A to 21C.

As described above, the projection optical system 110 obtains the emission level that is the same as or close to the desired projection angle range by the incidence plane 5110, and distributes the light having relatively strong intensity from the center portion of the laser diode LD to the circumference portion of the effective irradiation range by the emission plane S120. The projection optical system 110 therefore can form the light distribution pattern of the uniform emission intensity in the effective irradiation range.

The projection optical system 110 can be therefore downsized while effectively introducing the light volume of the light beam from the light source and maintaining a dimension for molding such as the edge thickness of the optical element L110.

Embodiment 4

A projection optical system according to a fourth embodiment of the present invention will be described based on differences between the projection optical system according to the fourth embodiment and the projection optical system according to the above embodiments.

FIGS. 30A, 30B, and 30C are views each illustrating a projection optical system according to the fourth embodiment of the present invention. FIG. 30A is a perspective view, FIG. 30B is an x-y plane view, and FIG. 30C is an x-z plane view. As illustrated in FIGS. 30A, 30B, and 30C, a projection optical system 210 according to the fourth embodiment differs from the projection optical system 110 according to the third embodiment in that an incidence plane S210 of an optical element L210 has a refractive power only in the Z-axis direction. The curvature radius of the incidence plane S210 is −10 mm.

Figure 31B:
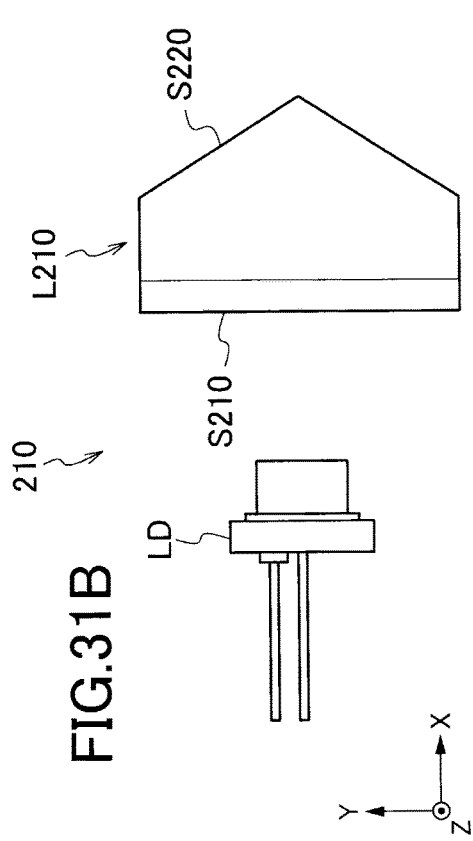
FIGS. 31A, 31B, and 31C are views illustrating one example of the projection optical system according to the fourth embodiment of the present invention.
Figure 31C:
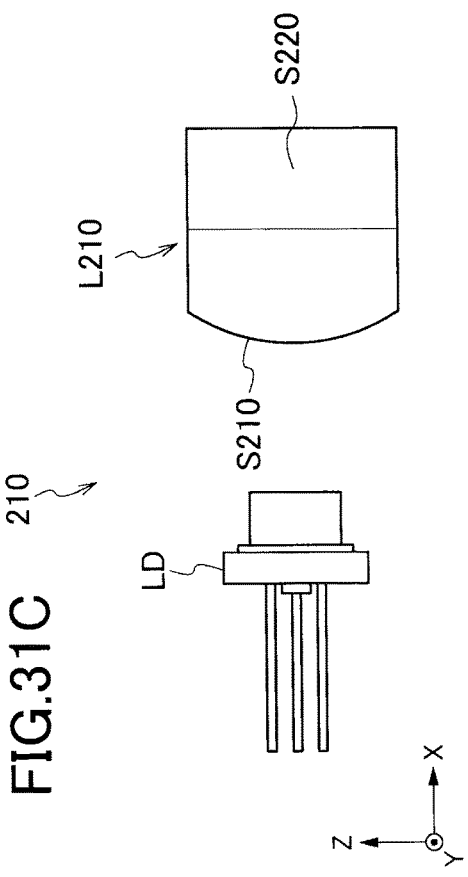
Figure 31A:
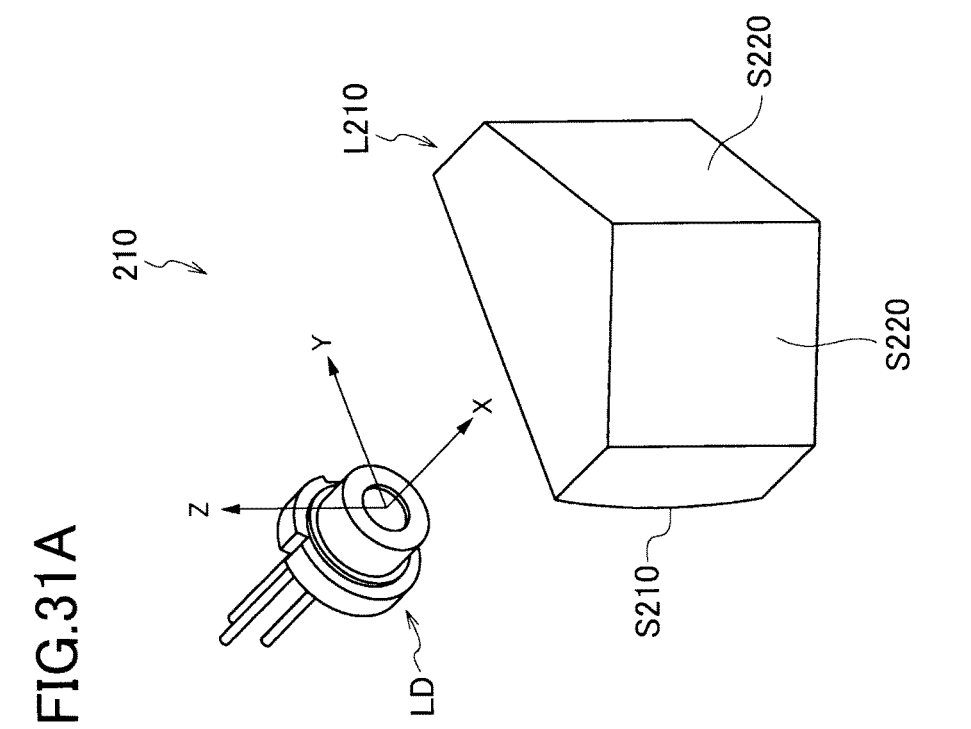

FIGS. 31A, 31B, and 31C are views showing one example of the projection optical system according to the fourth embodiment of the present invention. FIG. 31A is a perspective view, FIG. 31B is an x-y plane view, and FIG. 31C is an x-z plane view. As illustrates in FIGS. 31A, 31B, and 31C, the incidence plane S210 may have a convex plane relative to the laser diode LD. When the incidence plane S210 has the convex plane, the focal distance is 20 mm from the principal point of the optical element L210.

As described above, according to the projection optical system 210, the light volume distribution in the Y-axis direction can be equalized by an emission plane 5220, and the light volume distribution range can be changed while maintaining the Gaussian profile of the emission intensity distribution in the Z-axis direction.

Embodiment 5

A projection optical system according to a fifth embodiment of the present invention will be described based on the differences between the projection optical system according to the fifth embodiment and the projection optical systems according to the above embodiments.

Figure 32B:
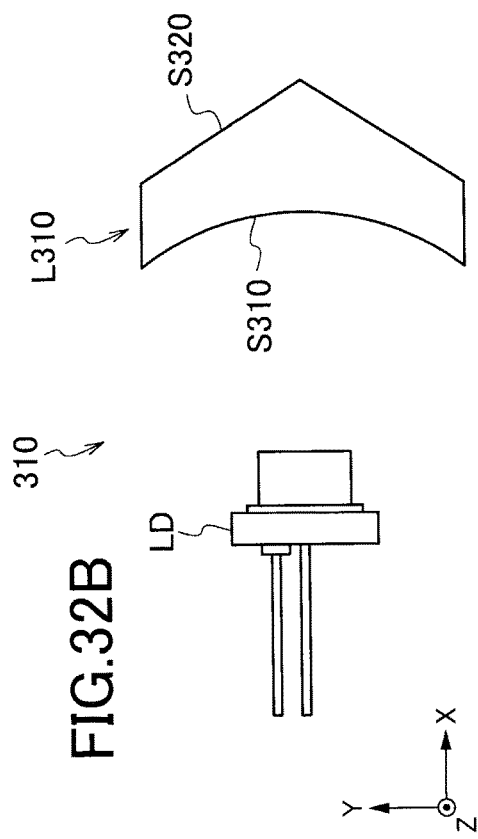
FIGS. 32A, 32B, and 32C are views illustrating one example of the projection optical system according to a fifth embodiment of the present invention.
Figure 32C:
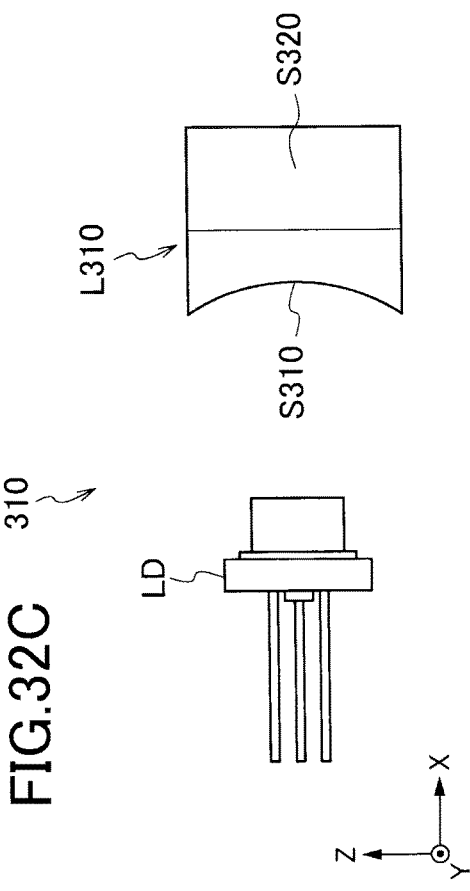
Figure 32A:
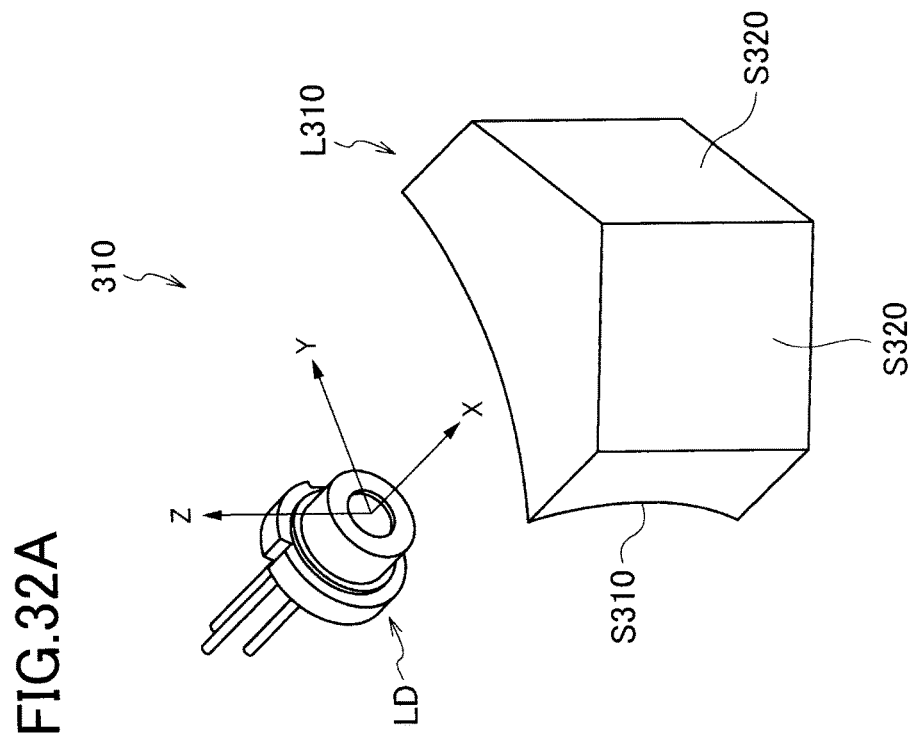

FIGS. 32A, 32B, and 32C are views illustrating the projection optical system according to the fifth embodiment of the present invention. FIG. 32A is a perspective view, FIG. 32B is an x-y plane view, and FIG. 32C is an x-z plane view. As illustrated in FIGS. 32A, 32B, and 32C, a projection optical system 310 of the present embodiment differs from the projection optical system 110 and the projection optical system 210 in that an incidence plane S310 of an optical element L310 has a refractive power in both of the Y-axis direction and the Z-axis direction. The curvature radius of the incidence plane S310 is −20 mm in the Y-axis direction and −18 mm in the Z-axis direction.

The incidence plane S310 has a toroidal plane having a curvature in the two directions of the Y-axis direction and the Z-axis direction although the above-described projection optical system has the cylindrical plane having a curvature in the Y-axis direction or the Z-axis direction.

Various planes, for example, a spherical plane, aspheric plane, anamophic aspheric plane, and adjustable plane can be adopted for the incidence plane S310 in addition to the toroidal plane according to the projection angle range required by the projection optical system 310.

When the incidence plane S310 has, for example, a spherical plane, a change in the projection angle range relative to a variation in position and inclination of the optical element and the light volume distribution can be reduced.

As described above, according to the projection optical system 310, the light volume distribution range can be changed by maintaining the profile of the Gaussian emission intensity distribution in the Z-axis direction while equalizing the light volume distribution in the projection angle range in the Y-axis direction and obtaining a desired profile.

Embodiment 6

A projection optical system according to a sixth embodiment of the present invention will be described based on the differences between the projection optical system according to the sixth embodiment and the projection optical systems according to the above embodiments.

FIGS. 33A, 33B, and 33C are views illustrating a projection optical element according to the sixth embodiment of the present invention. FIG. 33A is a perspective view, FIG. 33B is an x-y plane view, and FIG. 33C illustrates an x-z plane view. As illustrated in FIGS. 33A to 33C, a projection optical system 41 of the present embodiment differs from the above described projection optical elements in that an incidence plane S41 of an optical element L41 has a toroidal plane. The incidence plane S41 of the optical element L41 includes a curvature radius of −5 mm in the Y-axis direction and a curvature radius of 22 mm in the Z-axis direction.

The projection optical system 41 includes an emission plane S42 having four flat planes jointed to each other. The projection optical system 41 differs from the above-described projection optical systems in that the emission plane S42 has a hipped roof shape with the jointed portions of the flat planes as edge lines. The jointed planes of the emission plane S42 incline ±15° relative to the Y-axis and ±9° relative to the Z-axis. The emission plane S42 includes a first inclination plane that inclines in the direction of the light-emitting surface in the Y-axis direction and a second inclination plane that inclines in the direction of the light-emitting surface in the Z-axis direction as the second direction.

Figure 34:
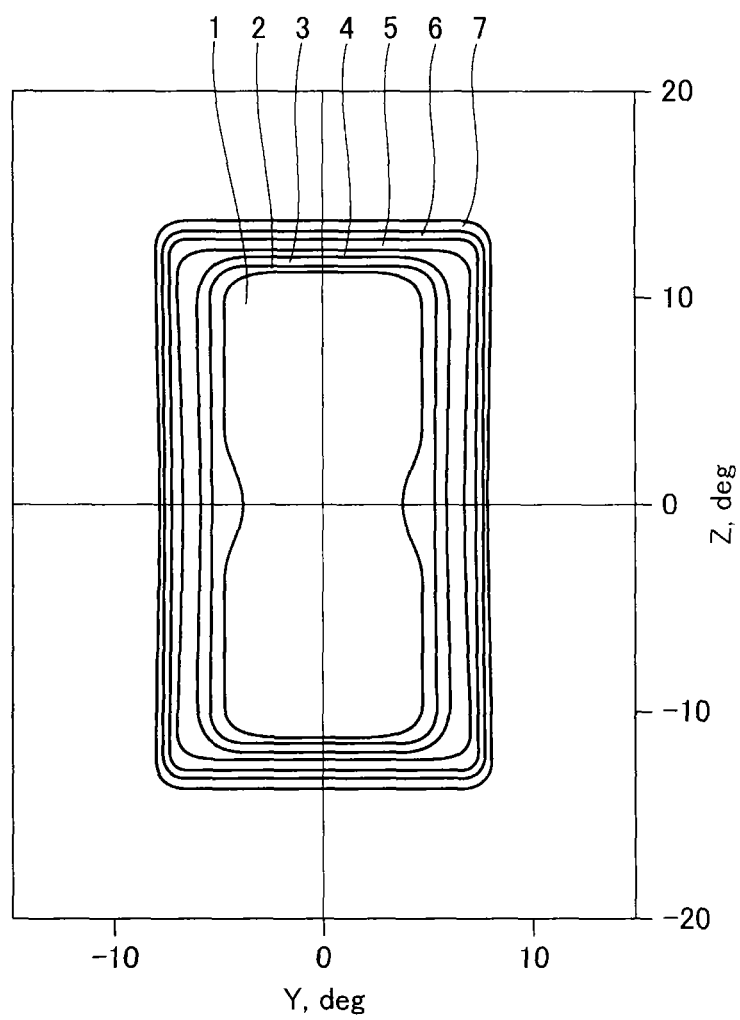
FIG. 34 is a diagram illustrating a light distribution pattern by the projection optical system in FIGS. 33A to 33C.
Figure 35:
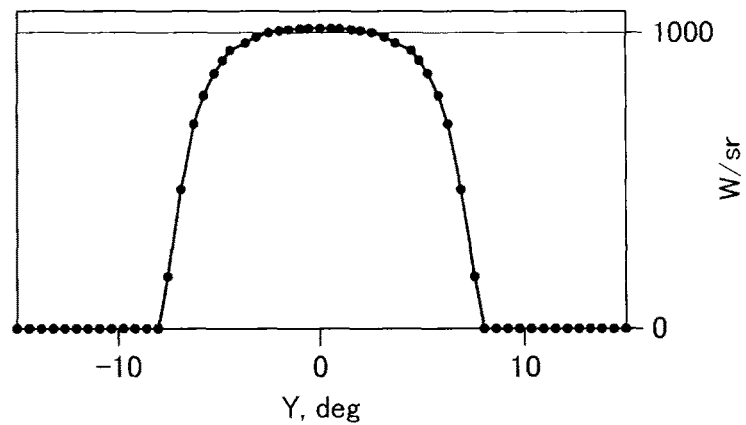
FIG. 35 is a diagram showing an emission intensity distribution pattern in the Y-axis direction in the light distribution pattern in FIG. 34.
Figure 36:
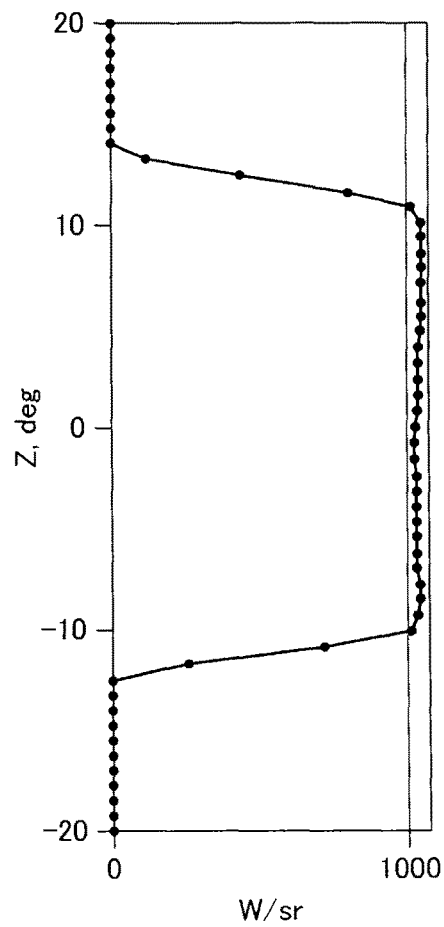
FIG. 36 is a diagram showing an emission intensity distribution pattern in the Z-axis direction in the light distribution pattern in FIG. 34, FIGS. 37A, 37B, and 37C are views illustrating a projection optical system according to a seventh embodiment of the present invention.

FIG. 34 is a diagram showing the light distribution pattern by the projection optical system 41 illustrated in FIGS. 33A to 33C. In this embodiment, the laser diode LD has a divergent angle of 23° in the Y-axis direction and a divergent angle of 9° in the Z-axis direction. FIG. 35 is a diagram showing the emission intensity distribution in the Y-axis direction in the light distribution pattern of FIG. 34. FIG. 36 is a diagram showing the emission intensity distribution in the Z-axis direction in the light distribution pattern of FIG. 34. As illustrated in FIGS. 34 to 36, the projection optical system 41 obtains an approximately constant emission intensity distribution in the range of ±10° in the Z-axis direction and in the range of ±8° in the Y-axis direction.

As described above, according to the projection optical system 41, the desired profile can be obtained while equalizing the light volume distribution in the projection angle range both in the Y-axis direction and the Z-axis direction.

Embodiment 7

A projection optical system according to a seventh embodiment of the present invention will be described based on differences between the projection optical system according to the seventh embodiment and the projection optical elements according to the above embodiments.

FIGS. 37A, 37B, and 37C are views illustrating a projection optical system according to the seventh embodiment of the present invention. FIG. 37A is a perspective view, FIG. 37B is an x-y plan view, and FIG. 37C is an x-z plan view. As illustrated in FIGS. 37A, 37B, and 37C, the projection optical system 51 of the present embodiment differs from the above-described projection optical system 41 in that an incidence plane S51 of the optical element L51 has a flat plane without having the refractive power both in the Y-axis direction and the Z-axis direction.

The four jointed planes of an emission plane S52 incline ±15.5° relative to the Y-axis and ±5.5° relative to the Z-axis. The laser diode LD has a divergent angle of 23° in the Y-axis direction and a divergent angle of 9° in the Z-axis direction.

Figure 38:
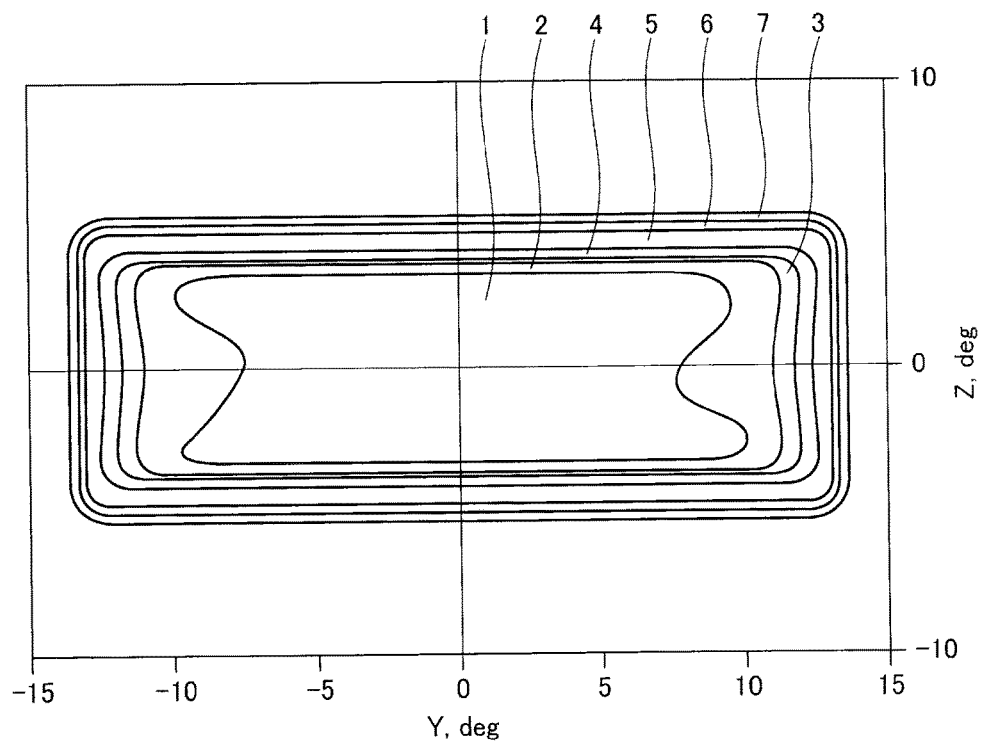
FIG. 38 is a diagram illustrating a light distribution pattern by the projection optical system in FIGS. 37A to 37C.
Figure 39:
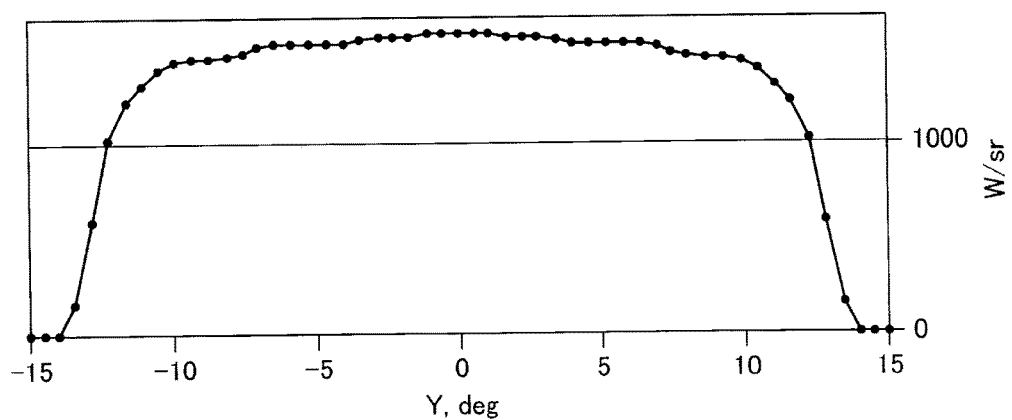
FIG. 39 is a diagram showing an emission intensity distribution pattern in the Y-axis direction in the light distribution pattern in FIG. 38.
Figure 40:
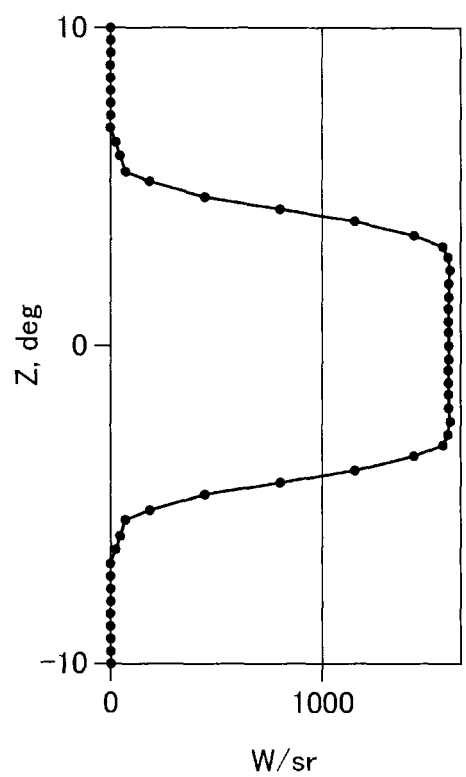
FIG. 40 is a diagram showing an emission intensity distribution pattern in the Z-axis direction in the light distribution pattern in FIG. 38.

FIG. 38 is a diagram illustrating a light distribution pattern by the projection optical system 51 illustrated in FIGS. 37A to 37B. FIG. 39 is a diagram showing the emission intensity distribution in the Y-axis direction in the light distribution pattern of FIG. 38. FIG. 40 is a diagram showing the emission intensity distribution in the Z-axis direction in the light distribution pattern of FIG. 38. As illustrated in FIGS. 38 to 40, the projection optical system 41 obtains an approximately constant emission intensity distribution in the range of ±4° in the Y-axis direction and the range of ±10° in the Z-axis direction.

The projection optical system 51 is arranged such that the inclination direction of the emission plane S52, the direction of the first divergent angle θy and the direction of the second divergent angle θz of the laser diode LD are aligned. The relationship between the first divergent angle θy and the second divergent angle θz is θy>θz. The emission plane S52 has the projection angle in the Y-axis direction larger than the projection angle in the Z-axis direction.

As described above, according to the projection optical system 51, the weak refractive power of the optical element 51 can be set by lowering the conversion level of the angle when converting the divergent angle of the laser diode LD to the projection angle range. According to the projection optical system 51, a change in the light volume distribution and the projection angle range due to a variation in the position of the optical element can be therefore reduced. According to the projection optical system 51, the edge thickness of the optical element 51 can be easily obtained, so that the design freedom degree of the optical element L51 can be improved.

Since the relationship between the incidence plane and the emission plane according to each of the third to the seventh embodiments is the same as that according to the first embodiment, the description thereof will be omitted.

In addition, each of the above-described projection optical systems 110, 210, 310, 41, and 51 can be used for the objection detection device 10 described in the first embodiment of the present invention in addition to the projection optical systems 11 and 12.

As described above, according to the object detection device according to the embodiments of the present invention, the existence or non-existence of the object and the position of the object can be specified in the desired effective irradiation range by the projection optical system and the light-receiving optical system.

What is claimed is:

1. A projection optical system comprising:
   a light source to emit light; and
   an optical element including an incidence plane on which the light from the light source is incident and an emission plane having a plurality of flat planes to emit the light, wherein
   when one direction parallel to a light-emitting surface of the light source is defined as a Y-axis direction, a direction having a right angle to the Y-axis direction which is a direction parallel to the light-emitting surface is defined as a second Z-axis direction, directions having the right angle to both of the Y-axis direction and the Z-axis direction are defined as X-axis directions, and an angle range to emit light having predetermined emission intensity or more in a predetermined direction is defined as a divergent angle, the light emitted from the light source has a first divergent angle in the Y-axis direction with an X-axis on an XY plane as a center and a second divergent angle in the Z-axis direction with the X-axis on the XY plane as the center,
   the plurality of flat planes includes a first inclination plane inclining in the Y-axis direction relative to the light-emitting surface on the XY plane, and
   the optical element has an angle between the first inclination plane and a traveling direction of the light incident on the incidence plane that is the same as the first divergent angle.

2. The projection optical system according to claim 1, wherein
   the plurality of flat planes includes a second inclination plane inclining in the Z-axis direction relative to the light-emitting surface on the XY plane.

3. The projection optical system according to claim 2, wherein
   the optical element has an angle between the second inclination plane and a traveling direction of the light incident on the incidence plane that is a same as the second divergent angle.

4. The projection optical system, according to claim 1, wherein
the first divergent angle is larger than the second divergent angle.

5. The projection optical system according to claim 1, wherein
the incidence plane has a refractive power at least in the Y-axis direction.

6. The projection optical system according to claim 5, wherein the incidence plane has a refractive power both in the Y-axis direction and the Z-axis direction.

7. An object detection device comprising the projection optical system according to claim 1.

8. A projection optical system comprising:
a light source to emit light; and
an optical element including an incidence plane on which the light from the light source is incident and an emission plane having a plurality of flat planes to emit the light, wherein
when one direction parallel to a light-emitting surface of the light source is defined as a Y-axis direction, a direction having a right angle to the Y-axis direction which is a direction parallel to the light-emitting surface is defined as a Z-axis direction, directions having the right angle to both of the Y-axis direction and the Z-axis direction are defined as X-axis directions, and an angle range to emit light having predetermined emission intensity or more in a predetermined direction is defined as a divergent angle, the light emitted from the light source has a first divergent angle in the Y-axis direction with an X-axis on an XY plane as a center and a second divergent angle in the Z-axis direction with the X-axis on the XZ plane as the center,
the plurality of flat planes includes a second inclination plane inclining in the Z-axis direction relative to the light-emitting surface on the XY plane, and
the optical element has an angle between the second inclination plane and a traveling direction of the light incident on the incidence plane that is the same as the second divergent angle.

9. The projection optical system according to claim 8, wherein the plurality of flat planes includes a first inclination plane inclining in the Y-axis direction relative to the light-emitting surface on the XY plane.

10. The projection optical system according to claim 9, wherein the optical element has an angle between the first inclination plane and a traveling direction of the light incident on the incidence plane that is a same as the first divergent angle.

11. The projection optical system according to claim 8, wherein the first divergent angle is larger than the second divergent angle.

12. The projection optical system according to claim 8, wherein the incidence plane has a refractive power at least in the Y-axis direction.

13. The projection optical system according to claim 12, wherein the incidence plane has a refractive power both in the Y-axis direction and the Z-axis direction.

14. An object detection device comprising the projection optical system according to claim 8.

* * * * *